US012629953B2

(12) United States Patent
Roth et al.

(10) Patent No.: US 12,629,953 B2
(45) Date of Patent: May 19, 2026

(54) METHODS AND COMPOSITION FOR THE FABRICATION OF 3D PERFUSABLE NETWORKS

(71) Applicant: The Board of Trustees of the Leland Stanford Junior University, Stanford, CA (US)

(72) Inventors: Julien G. Roth, Redwood City, CA (US); Sungchul Shin, Redwood City, CA (US); Alexis J. Seymour, Redwood City, CA (US); Sarah C. Heilshorn, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 261 days.

(21) Appl. No.: 18/142,931

(22) Filed: May 3, 2023

(65) Prior Publication Data

US 2023/0398803 A1     Dec. 14, 2023

Related U.S. Application Data

(60) Provisional application No. 63/338,368, filed on May 4, 2022.

(51) Int. Cl.
*B41M 5/52* (2006.01)
*C09D 11/03* (2014.01)
*C09D 11/04* (2006.01)

(52) U.S. Cl.
CPC ........ *B41M 5/5254* (2013.01); *B41M 5/5218* (2013.01); *C09D 11/03* (2013.01); *C09D 11/04* (2013.01)

(58) Field of Classification Search
CPC .. B29C 64/106; B41M 5/5218; B41M 5/5254
See application file for complete search history.

(56) References Cited

U.S. PATENT DOCUMENTS 11,491,702 B2 * 11/2022 Guvendiren ............ A61L 27/56

OTHER PUBLICATIONS

Hull et al., (2021) "3D bioprinting using Universal orthogonal network (UNION) bioinks." Advanced Functional Materials, vol. 31, No. 7, 2007983, 11 pages.
Seymour et al., (2021) "3D Printing of Microgel Scaffolds with Tunable Void Fraction to Promote Cell Infiltration." Adv. Healthc. Mater., vol. 10, No. 18, e2100644, 29 pages.
Shin et al., (2017) "Matrix-assisted three-dimensional printing of cellulose nanofibers for paper microfluidics." ACS Applied Materials & Interfaces, No. 9, vol. 31, pp. 26438-26446.
Unagolla et al., (2020) "Hydrogel-based 3D bioprinting: A comprehensive review on cell-laden hydrogels, bioink formulations, and future perspectives." Applied Materials Today, vol. 18, 100479, 46 pages.

* cited by examiner

*Primary Examiner* — James Sanders
(74) *Attorney, Agent, or Firm* — Pamela J. Sherwood; Bozicevic, Field &Francis LLP

(57) ABSTRACT

Methods and compositions for fabricating 3D perfusable networks are described. The methods utilize (1) printable compositions comprising gelatin microgels or Pluronic F-127, and crosslinking initiators; and (2) support materials comprising crosslinkable polymers and gelling agents. In some embodiments, the support material further comprises a co-initiator.

19 Claims, 16 Drawing Sheets

(1) Diffusion of reaction-initiator   (2) Activation of crosslinking reaction   (3) Removal of sacrificial ink

Gel precursor support

Crosslinked shell

Hollow channel

Nozzle

Sacrificial ink

Sacrificial ink with reaction-initiator

Gel precursor support material

Crosslinked hydrogel shell

Gel precursor support materials
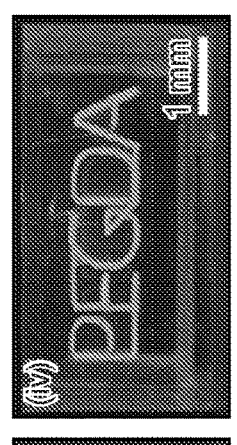
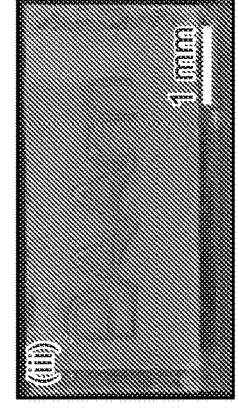
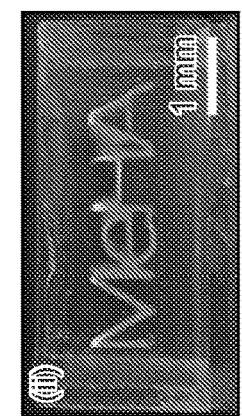
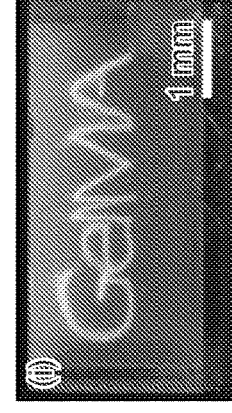
FIG. 2G
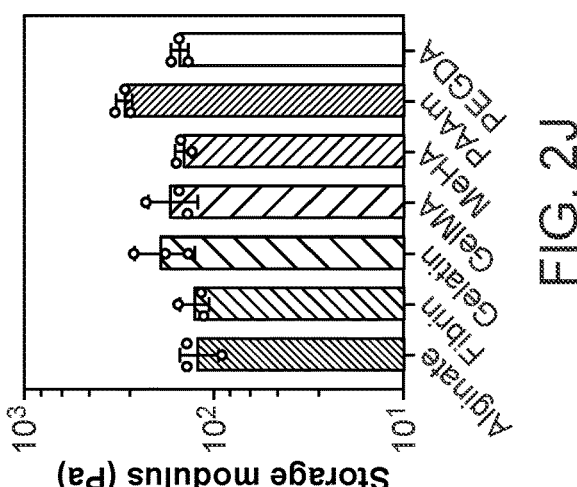
FIG. 2J
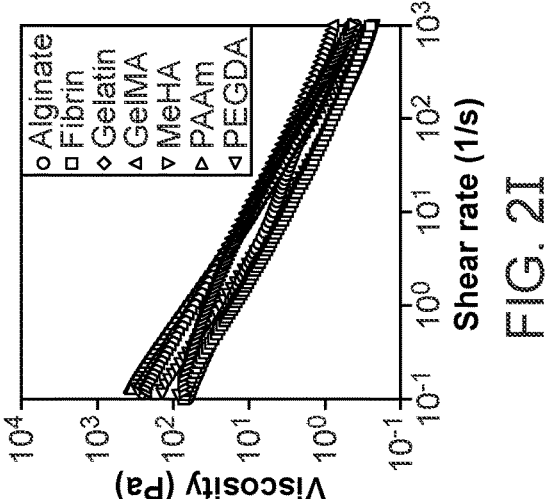
FIG. 2I
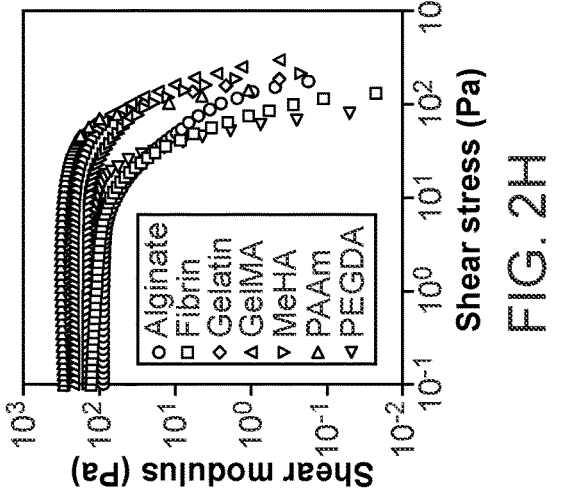
FIG. 2H Inner channel diameter
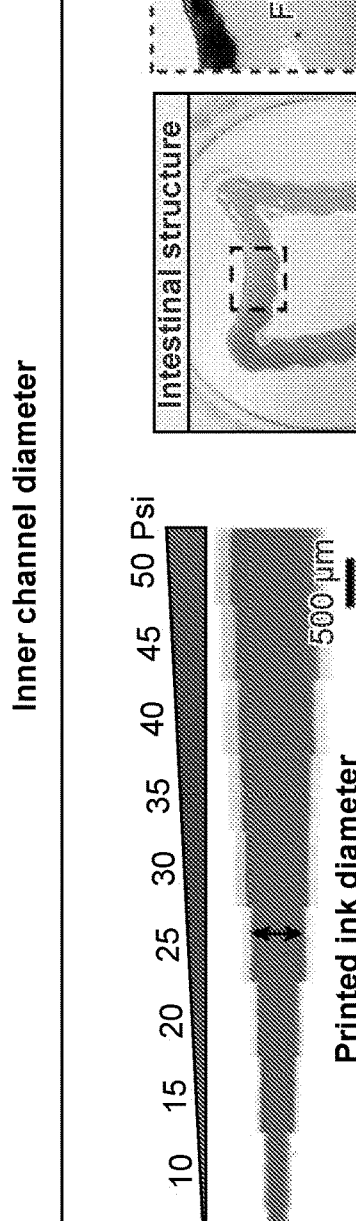
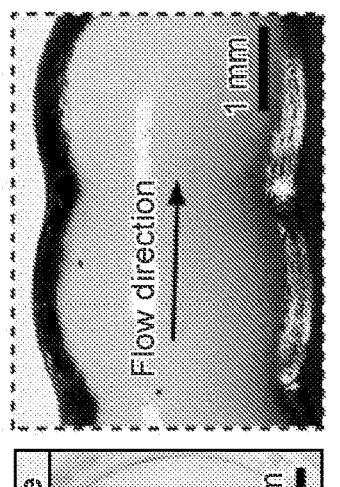
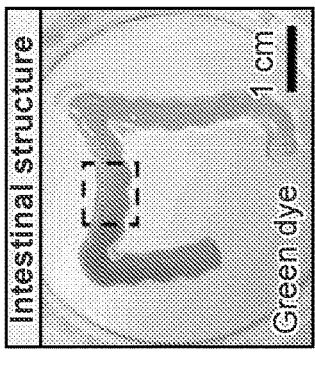
FIG. 3D
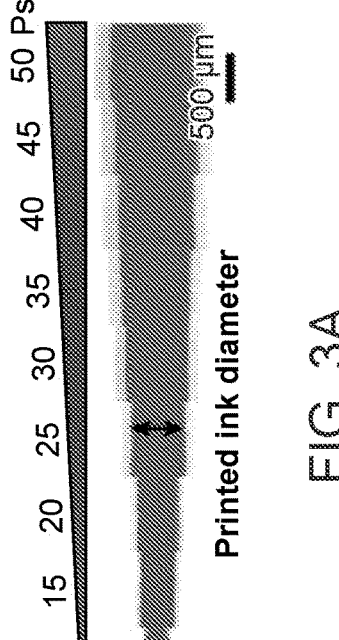
FIG. 3A
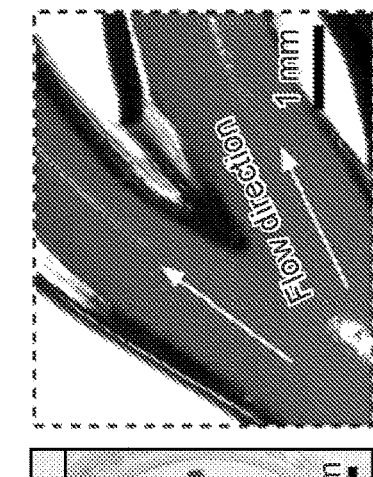
FIG. 3E
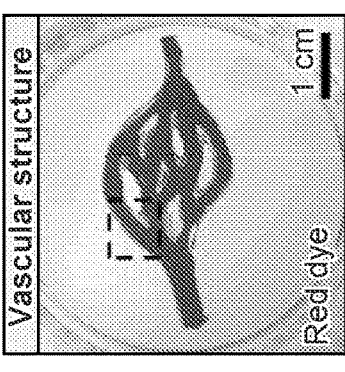
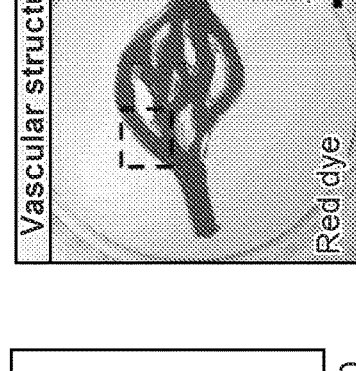
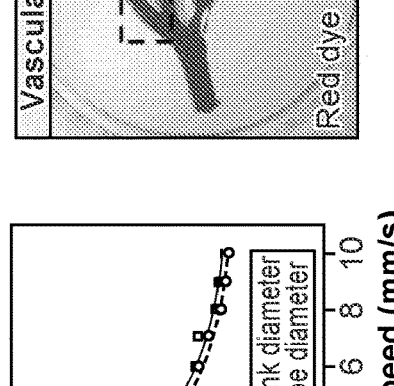
FIG. 3C
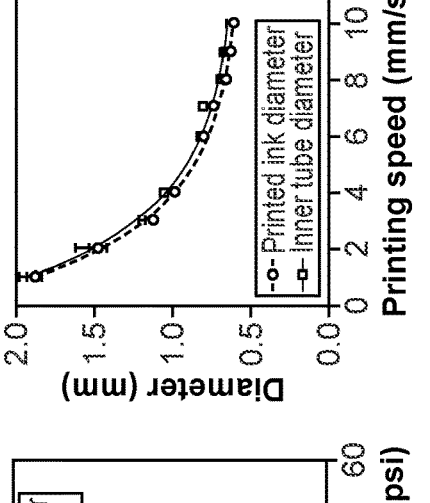
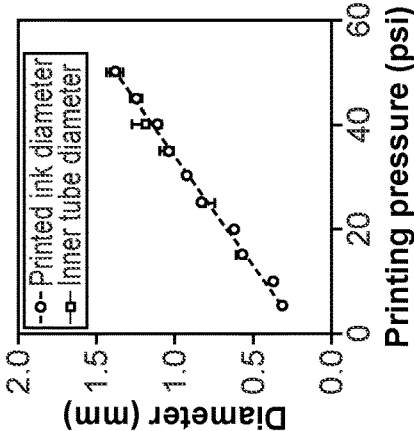
FIG. 3B

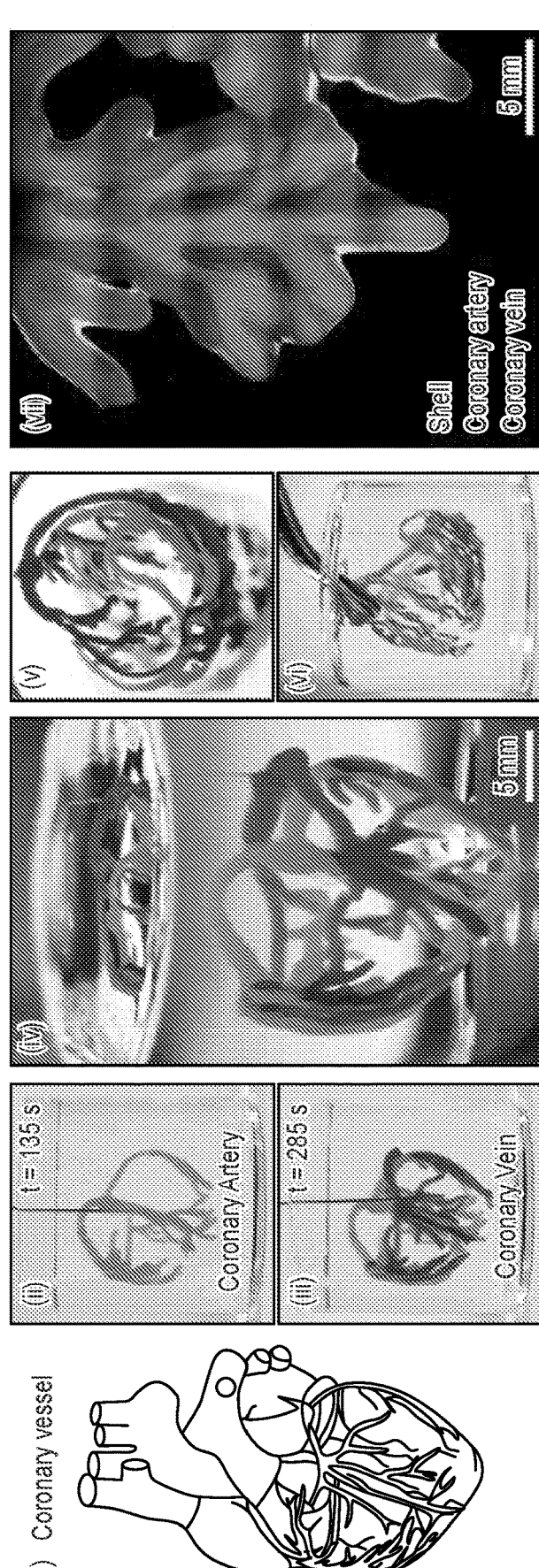
FIG. 4F
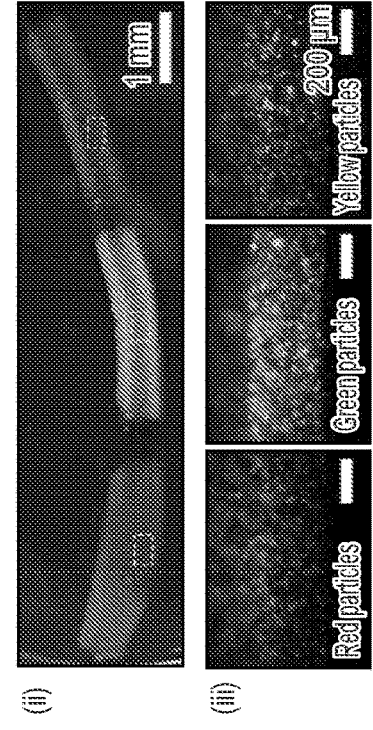
FIG. 4G
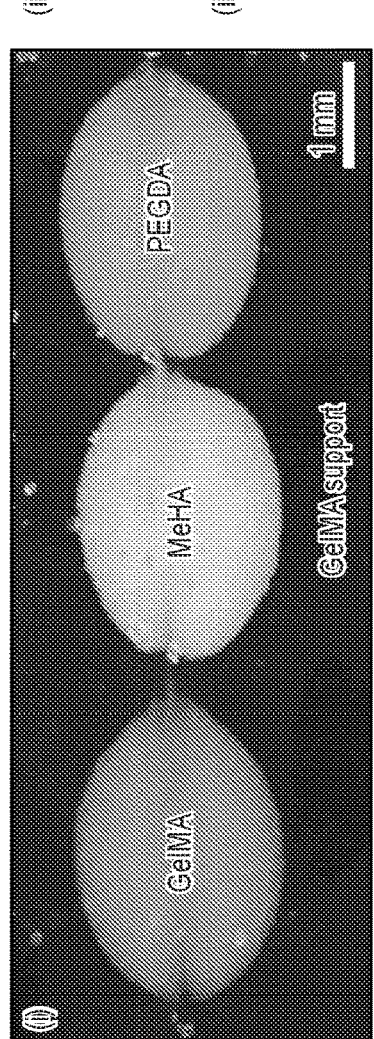

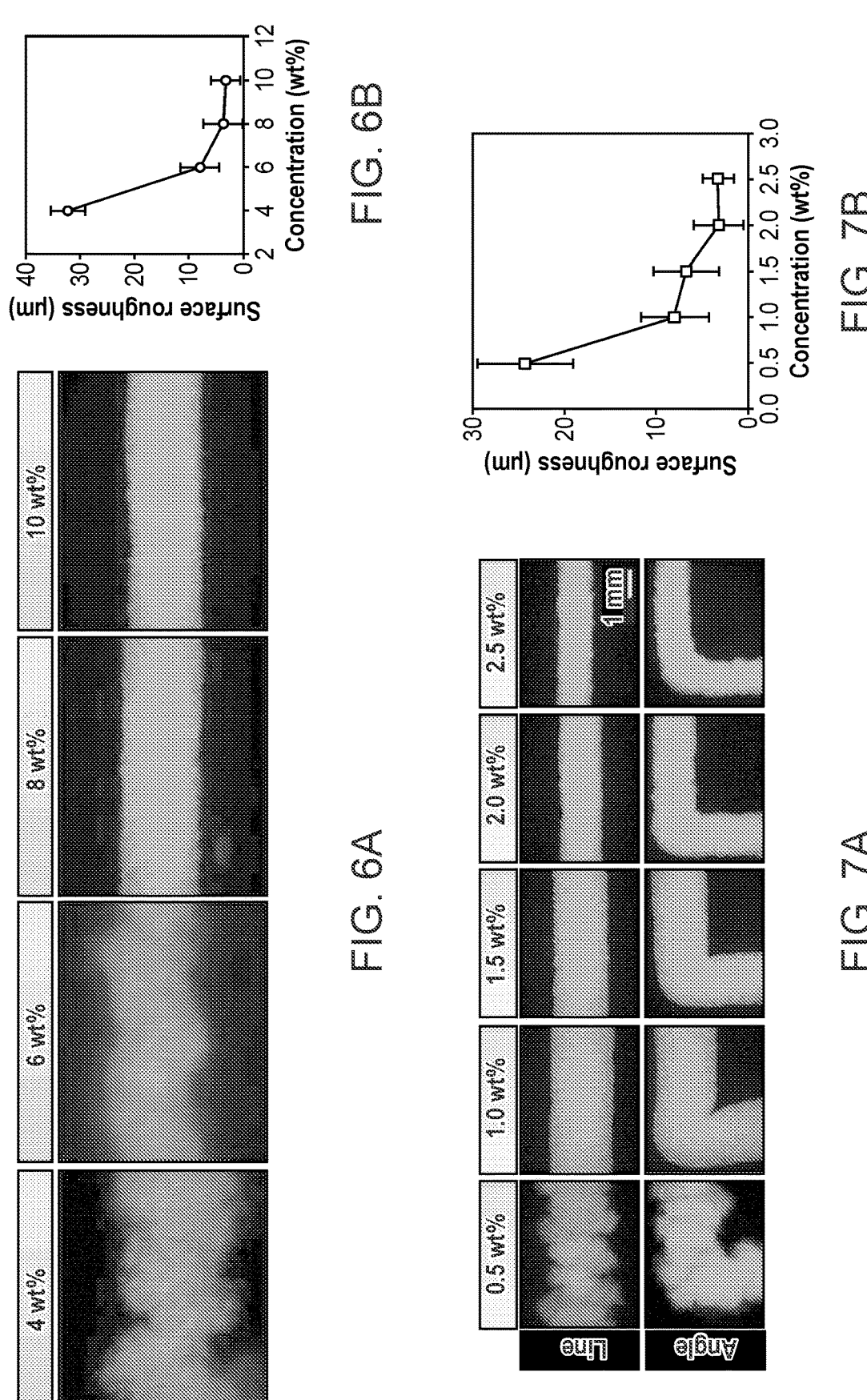

FIG. 12

METHODS AND COMPOSITION FOR THE FABRICATION OF 3D PERFUSABLE NETWORKS

CROSS-REFERENCE TO RELATED APPLICATIONS

This application claims the benefit of U.S. Provisional Patent Application No. 63/338,368, filed May 4, 2022, which application is incorporated herein by reference in its entirety.

GOVERNMENT RIGHTS

This invention was made with Government support under contract DMR 2103812 awarded by the National Science Foundation. The Government has certain rights in the invention.

BACKGROUND

Perfusion remains one of the most critical challenges in the formation of three-dimensional (3D) multicellular structures, whether for the purposes of tissue engineering, 3D in vitro models of organ development and disease, or fundamental studies of cell behavior. The need for perfusable structures is perhaps best demonstrated through the vasculature. Due to the diffusion limits of oxygen and other vital nutrients, most cells within the body are located within 200 $\mu$m of a capillary. In vitro, cells in large 3D cultures require interpenetrating, stable vascular-like networks to provide the oxygen and nutrients needed for survival. While we now have a significant understanding of the process of angiogenesis, the technology to fabricate several key features of a functional vascular network is still lacking. This includes the presence of multi-scale, branched structures (e.g., bifurcations and trifurcations) as well as the increasing and decreasing diameters of vessels that are naturally found in vivo. These same challenges of fabricating channels with specified geometry are important for multiple tissues throughout the body, including (but not limited to) lymphatics, airways, and the gastrointestinal tract.

Provided herein are methods and compositions for the fabrication of perfusable 3D networks using 3D bioprinting.

SUMMARY

Methods and compositions for fabricating 3D perfusable networks, e.g. for use in 3D bioprinting, are provided. Benefits of the network compositions include, without limitation, fabrication of complex networks with seamless junctions at branch points with user defined geometry; compatibility with existing printable compositions and novel printable compositions; networks that can transport fluids or gases; and fabrication of vessel structures with varying luminal diameters within the same network. The methods of the disclosure allow for the independent tunability of both the inner and outer diameters of the printed channels.

The methods of the disclosure utilize (1) support materials comprising crosslinkable polymers and gelling agents; and (2) printable compositions comprising a sacrificial ink, and crosslinking initiators suitable for initiating crosslinks in the selected support material. The support material may further comprise a gelling agent (viscosity modulator), for example aristoflex AVC. Sacrificial inks of interest include gelatin microgels, or a poloxamer polymer, e.g. Pluronic F-127, which can be melted with an alteration of temperature. In some embodiments, the support material further comprises a co-initiator.

The support material comprises a crosslinkable polymer and a gelling agent. Injecting the printable composition into the support material allows for the diffusion of the crosslinking initiator from the printable composition into the support material, thereby initiating the crosslinking of the crosslinkable polymers around said printable composition, resulting in the formation of crosslinked networks where the printable composition is encased in the crosslinked polymers. Melting the sacrificial ink in the printable composition encased in the crosslinked polymers, generates 3D hollow (i.e. perfusable) networks. In some embodiments, a sacrificial ink comprising gelatin microgels is melted by raising the temperature of the support material to at least about 25° C., at least about 30° C., at least about 33° C., and up to about 37° C. In some embodiments, a sacrificial ink comprising a poloxamer polymer, e.g. Pluronic F-127, is melted by lowering the temperature of the support material to less than about 10° C., less than about 5° C., and down to about 0° C.

In some embodiments, a method for fabricating a 3D perfusable network comprises (i) contacting a support material with an injection means, (ii) injecting a printable composition into the support material using the injection means, and (iii) moving the injection means in a desired 3D shape, wherein the injection means continuously injects the printable composition into the support material. In some embodiments, the method further comprises altering the temperature of the support material to allow for melting of the sacrificial ink after step (iii). In some embodiments, the method further comprises exposing the support material to ultraviolet irradiation.

The methods of the invention allow for a variety of crosslinking mechanisms to be utilized in fabrication of the 3D perfusable networks including, without limitation, photocrosslinking; crosslinking with small molecules; enzymatic crosslinking; etc. Photocrosslinking mechanisms may utilize photocrosslinking polymers. Any photocrosslinking polymers deemed useful to the fabrication of the desired 3D perfusable network may be used. For instance, photocrosslinkable polymers include, without limitation, gelatin methacryloyl (GelMA), methacrylated hyaluronic acid (MeHA), poly(ethylene glycol) diacrylate (PEGDA), etc. When photocrosslinking is desired, a specific crosslinking initiator may be used. In some embodiments, the crosslinking initiator is Lithium Phenyl(2,4,6-trimethylbenzoyl)phosphinate (LAP). When photocrosslinking is desired, the method further comprises exposing the support material to ultraviolet irradiation.

Crosslinking with small molecules may utilize small molecule crosslinkable monomers or polymers. Any small molecule crosslinkable monomer or polymer deemed useful to the fabrication of the desired 3D perfusable network may be used. For instance, small molecule crosslinkable monomers include, without limitation, acrylamide, and small molecule crosslinkable polymers include, without limitation, polyacrylamide (PAAm); alginate; etc. When crosslinking with small molecules is desired, a specific crosslinking initiator may be used. In some embodiments, when the small molecule crosslinkable polymer is alginate, the crosslinking initiator is $CaCl_2$. In some embodiments, when the small molecule crosslinkable monomer is acrylamide, the polymerization initiator is ammonium persulfate (APS). When the small molecule crosslinkable monomer is acrylamide, the support material further comprises a co-initiator.

In some embodiments, the co-initiator is Tetramethylethyl-enediamine (TEMED) and the crosslinker is Bis Acrylam-ide.

Enzymatic crosslinking may utilize enzymatic crosslink-able polymers. Any enzymatic crosslinkable polymer useful in the fabrication of the desired 3D perfusable network may be used. For instance, enzymatic crosslinkable polymers include, without limitation, fibrinogen, gelatin, etc. When enzymatic crosslinking is desired, a specific crosslinking initiator may be used. In some embodiments, when the enzymatic crosslinkable polymer is fibrinogen, the cross-linking initiator is thrombin. In some embodiments, when the enzymatic crosslinkable polymer is gelatin, the cross-linking initiator is transglutaminase. In some embodiments, when the enzymatic crosslinkable polymer is gelatin, the sacrificial ink comprises a poloxamer polymer.

The printable composition may utilize any crosslinking initiator deemed beneficial to the fabrication of the desired 3D perfusable network, with respect to the chosen cross-linking mechanism. For example, the crosslinking initiator may be any of the crosslinking initiators disclosed above. The crosslinking initiator may be in any concentration that is sufficient to initiate crosslinking of the polymers within the support materials. For instance, when the crosslinking initiator is $CaCl_2$, it may be in a concentration from at least about 0.1% to about 10% weight by volume of the compo-sition. When the crosslinking initiator is APS it may be in a concentration from at least about 5 mM to about 50 mM. When the crosslinking initiator is LAP it may be in a concentration from at least about 1 mM to about 10 mM. When the crosslinking initiator is thrombin it may be in a concentration from at least about 100 $Uml^{-1}$ to about 1000 $U\ ml^{-1}$. When the crosslinking initiator is transglutaminase it may be in a concentration from at least about to about 10% weight by volume of the composition.

The crosslinking method can be selected based on the desired use of the perfusable structure. For example, pho-tocrosslinking allows greater control over crosslinking kinetics, as a result of crosslinking reactions only being initiated upon exposure to ultraviolet irradiation. This para-digm allows for the fabrication of complex intersectional designs. Enzymatic crosslinking mechanisms are not toxic to biological materials, making them particularly cell com-patible.

The support material of the present disclosure may com-prise a crosslinkable polymer and a gelling agent (viscosity modulator). In some embodiments, the gelling agent is aristoflex AVC, e.g. at a concentration of from about 0.2%, 0.5%. 1%, 1.5%, 2%, 2.5%, 3%, etc., and in some embodi-ments at a concentration of about 2%.

In some embodiments, the support material further com-prises a co-initiator. In some embodiments, the co-initiator is Tetramethylethylenediamine (TEMED) and the crosslinker Bis-Acrylamide. The support material may utilize any cross-linkable polymer deemed beneficial to the fabrication of the desired 3D perfusable network, particularly with respect to a chosen crosslinking mechanism. For example, the cross-linkable polymer may be any of the crosslinkable polymers disclosed above.

The crosslinkable polymer may be in any concentration that is sufficient to generate 3D perfusable networks of the polymers within the support materials. For instance, when the crosslinkable polymer is alginate, it may be in a con-centration from at least about 0.1% to about 10% weight by volume of the composition. When the crosslinkable polymer is PAAm it may be in a concentration from at least about 10% to about 50% weight by volume of the composition.

When the crosslinkable polymer is GelMA it may be in a concentration from at least about 1% to about 20% weight by volume of the composition. When the crosslinkable polymer is MeHa it may be in a concentration from at least about 0.1% to about 10% weight by volume of the compo-sition. When the crosslinkable polymer is PEGDA it may be in a concentration from at least about 1% to about 20% weight by volume of the composition. When the crosslink-able polymer is fibrinogen it may be in a concentration from at least about 1% to about 20% weight by volume of the composition. When the crosslinkable polymer is gelatin it may be in a concentration from at least about 1% to about 20% weight by volume of the composition.

In some embodiments, the printable composition com-prises cells. In other embodiments, cells are introduced into the perfusable network after it is formed. Cells may be selected, for example, to provide endothelial cell structures, or smooth muscle cell structures, typical of blood vessels.

The methods disclosed herein can fabricate 3D perfusable networks comprising various physical features. In some embodiments, the methods produce a 3D perfusable network comprising a fused intersection wherein a material, i.e a gas or a liquid, is able to traverse, i.e. flow freely through, said fused intersection. In some embodiments, the methods pro-duce a 3D perfusable network comprising non-fused inter-sections wherein a material, i.e a gas or a liquid, is not able to traverse said non-fused intersection. In some embodi-ments, the methods produce a 3D perfusable network com-prising a smooth and continuous exterior. In some embodi-ments, the methods produce a 3D perfusable network comprising variable diameters within the network. For instance, the diameter may vary from at least about 50 μm to at least about 2000 μm. In some embodiments, the methods produce a 3D perfusable network comprising angles from at least about 10° to at least about 180° Using photocrosslinkable materials allows a design of two or more distinct perfusable networks within the same structure by formulating the sacrificial ink to be thixotropic and self-healing, which allows the nozzle to pass through the printed path of the first network without causing permanent defor-mation while printing the path of the second network. Different materials that utilize the same reaction-initiator may also be crosslinked together into a cohesive print.

A feature of the methods is the independent tunability of both the inner and outer diameters of the printed channels. Strategies for dynamically varying the ink filament diameter while injecting the printable composition into the support material include (a) varying the dosing pressure while the writing speed is held constant; or (b) holding the applied pressure constant while the writing speed is varied. In both cases, the diameter of the printed ink filament dictates the inner diameter of the crosslinked channels. While the inner diameter of the channels is controlled through parameters during the printing process, the outer diameter of the channel shell is controlled by the diffusion time after printing, during which the reaction-initiators diffuse away from the sacrifi-cial ink into the surrounding support material. With increas-ing diffusion time into the support material, the reaction-initiator reaches a farther distance away from the sacrificial ink, thus increasing the thickness of the outer shell. There-fore, the relationship between the post-printing diffusion time and outer diameter thickness is dependent on the diffusion rate of the reaction-initiator within the gel precur-sor support material. In addition to the diffusion time, the diffusion rate can be varied by changing the concentration of the reaction-initiator in the sacrificial ink. With higher concentrations of reaction-initiator, the outer shell diameter at a given time point increases. With these strategies, both the inner channel diameter and the outer shell diameter can be independently controlled.

In another aspect of the invention, a composition is provided. In some embodiments, the composition comprises a printable composition. In some embodiments, the printable composition comprises a gelatin microgel or a poloxamer polymer, e.g. Pluronic F-127, and a crosslinking initiator. In some embodiments, the printable composition further comprises a surfactant. In some embodiments, the printable composition further comprises cells. In some embodiments, the composition comprises a support material. In some embodiments, the support material comprises a crosslinkable polymer and a gelling agent. In some embodiments, the gelling agent is aristoflex AVC. In some embodiments, the support material further comprises a co-initiator. In some embodiments, the co-initiator is Tetramethylethylenediamine (TEMED) and the crosslinker Bis-Acrylamide.

BRIEF DESCRIPTION OF THE DRAWINGS

(FIG. 1a) Sequence of key steps in the GUIDE-3DP method: (1) A sacrificial ink containing a reaction-initiator is extruded into a corresponding gel precursor support material, and the reaction-initiator diffuses out of the sacrificial ink and into the gel precursor. (2) The crosslinking reaction occurs in areas that contain both the gel precursor and the reaction-initiator, forming a shell of crosslinked gel. (3) The sacrificial ink and unreacted gel precursor material are removed, resulting in a printed structure with an open, hollow lumen. (FIG. 1b) A sacrificial ink composed of gelatin microparticles (inset) is extruded into a GelMA support material. (FIG. 1c) The GUIDE-3DP method (panels i, ii) allows for the fabrication of seamless hollow channels, unlike the conventional approach of direct, layer-by-layer printing of tubular constructs (panels iii, iv). (FIG. 1d) The GUIDE-3DP method is amenable to a variety of common biomaterials and crosslinking approaches, demonstrated here with photocrosslinking (GelMA/LAP, MeHA/LAP, PEGDA/LAP), small molecule crosslinking (alginate/calcium ions ($Ca^{2+}$), PAAm/ammonium persulfate (APS)), and enzymatic crosslinking (fibrin/thrombin, gelatin/transglutaminase (TG)).

FIGS. 2A-2J. Material properties of the sacrificial ink and gel precursor support materials that enable GUIDE-3DP. (FIG. 2a) Fluorescence images of the gelatin microparticles used in the sacrificial ink prior to jamming, stained with rhodamine. (FIG. 2b) Distribution of gelatin microparticle diameters. Formulations of the gelatin microparticle sacrificial inks ranging from 4-10 wt % exhibit (FIG. 2c) yield stress (storage modulus G' represented with filled circles; loss modulus G" represented with dashed lines) and (FIG. 2d) shear-thinning behavior. The gelatin microparticle sacrificial ink (8 wt %) exhibits (FIG. 2e) self-healing and (FIG. 2f) thermoreversible behavior. (FIG. 2g) Sample prints of selected gel precursor support materials (i) GelMA, (ii) MeHA, (iii) PAAm, and (iv) PEGDA. Each gel precursor support material (alginate, PAAm, GelMA, MeHA, PEGDA, fibrin, and gelatin) with 2 wt % of the viscosity modifier Aristoflex AVC added has (FIG. 2h) a yield stress, (i) shear-thinning behavior, and (FIG. 2j) storage moduli between 100-1000 Pa in the linear viscoelastic regime.

FIGS. 3A-3K. The inner and outer diameters of channels printed with GUIDE-3DP can be independently tuned. (FIG. 3a) The diameter of printed inks increases with the application of greater pressure during extrusion, demonstrated between 5-50 psi. The inner diameter of the crosslinked channel corresponds to the diameter of the printed ink filament, which can be controlled (FIG. 3b) as a function of applied pressure (demonstrated at a constant printing speed of 5 mm/s) and (FIG. 3c) as a function of printing speed (demonstrated at a constant applied pressure of 25 psi). (FIG. 3d) An intestinal model of the haustra structure was printed by adjusting the printing speed alternately between 1 and 2 mm/s. In this way, the inner diameter of the channel undulated between 4.5 mm and 3.5 mm. Green dye was perfused inside the crosslinked print without any leakage. (FIG. 3e) Vascular-like networks with branch points can connect channels with varying inner diameters, with both parent (2.5 mm diameter) and daughter (1.5 mm diameter) vessels. Red dye was perfused inside the crosslinked print without any leakage. (FIG. 3f) Brightfield microscopy images of alginate, GelMA, and fibrin channels and (FIG. 3g) their outer shell thickness as a function of diffusion time. (FIG. 3h) FRAP analysis for freely diffusing fluorescent dextrans of varying molecular weights (0.7-250 kDa) in alginate, GelMA, and fibrin gel precursor support materials. (FIG. 3i) Confocal microscopy images of a fluorescent dextran (FITC-dextran, MW=10 kDa) diffusing from a single printed filament in a GelMA support material as a function of diffusion time. (FIG. 3j) Experimental measurements of diffusion are in close agreement with simulation results of predicted diffusion obtained with finite element analysis. (FIG. 3k) GelMA shell thickness is dependent on the concentration of the reaction-initiator (LAP) in the sacrificial ink.

FIGS. 4A-4G. Complex perfusable networks are fabricated with the GUIDE-3DP method. (FIG. 4a) (panel i) A computational model of a bifurcated channel predicts LAP diffusion into GelMA for a structure using two sacrificial inks with different LAP concentrations. (panel ii) GUIDE-3DP printing of the model in (i) confirmed fabrication of channels with differing shell thickness connected at an open branch point. (FIG. 4b) Fabrication of channels with differing shell thickness is also achieved by controlling the LAP diffusion time from a single sacrificial ink. (FIG. 4c) Neighboring, parallel channels can either fuse together to form a single bulk structure with two internal channels or remain as two distinct, separate channels. (FIG. 4d) Construction of a print mimicking the coronary sinus connected to small and middle cardiac veins (panel i). The theoretical concentration of LAP initially (panel ii) and 20 mins after 3D printing (panel iii). (FIG. 4e) Photo of printed coronary sinus and cardiac veins (panel i) and close-up fluorescent micrograph (panel ii) showing the GelMA shell (green) and sacrificial ink (blue). (FIG. 4f) To fabricate a model of the coronary vessels (panel i), the artery and vein networks were printed sequentially (panels ii and iii). Side and top views of the printed coronary vessel structure (panels iv and v). The printed coronary vessel structure can be picked up with forceps (panel vi). Close-up fluorescent micrograph showing the GelMA shell (green) around the arterial network (red) and the venous network (panel vii). (FIG. 4g) Multiple photocrosslinkable materials (GelMA, MeHA, and PEGDA) can be fabricated into a single channel structure using a print-in-print method. Individual regions of labeled GelMA, MeHA, and PEGDA are first printed within a GelMA support material (panel i). All three gel precursors are crosslinked with the same reaction-initiator (LAP) to form a continuous channel (panels ii and iii).

(FIG. 5a) Representative fluorescence images of a GelMA channel 3 days post-seeding: (i) image of viable (calcein AM) and dead (ethidium homodimer-1) HUVECs within the inner lumen (diameter=2 mm), with the outer vessel wall (thickness=1 mm) indicated by the solid gray lines; (ii) magnified view of cells at the vessel wall interface, with the acquisition position indicated by the dashed white box in (i). (FIG. 5b) 3D reconstruction of the HUVEC-lined vessel stained for F-actin cytoskeleton and nuclei. (FIG. 5c) Representative images of a HUVEC-lined, furcated GelMA structure: (i) brightfield image; (ii) fluorescence image of viable HUVECs (calcein AM) and (inset) magnified view at a channel furcation point; (iii) 3D reconstruction of the furcated channel network stained for F-actin; and (iv) depth-coded images with white arrow indicating the patent, circular vessel lumen.

FIGS. 6A-6B Surface roughness of 3D printed gelatin microparticle ink filaments of varying concentrations. (FIG. 6a) The concentration of gelatin microparticles (4-10 wt %) affects the fidelity of printed lines within a GelMA gel precursor support material (10 wt % GelMA, 2 wt % AVC). (FIG. 6b) The surface roughness of the printed gelatin microparticle ink filament decreases with increasing concentration of the gelatin microparticles, from 4-10 wt %.

FIGS. 7A-7B. Surface roughness of 3D printed gelatin microparticle ink filaments within a 10 wt % GelMA gel precursor support material with varying concentrations of Aristoflex AVC. (FIG. 7a) The concentration of the viscosity modifier Aristoflex AVC (0.5-2.5 wt %) added to 10 wt % GelMA affects the fidelity of printed lines and angles (8 wt % gelatin microparticles). (FIG. 7b) The surface roughness of the printed gelatin microparticle ink filament (8 wt %) decreases with increasing concentration of AVC within the GelMA, from 0.5-2.5 wt %.

(FIG. 8d) Representative FRAP images for FITC-dextrans (MW: 10 kDa, 40 kDa, and 250 kDa) in a GelMA support material, showing pre- and post-bleaching frames.

(FIG. 9a) GUIDE-3DP allows for open branch points at the intersection of two printed channels for photocrosslinkable materials, since the photocrosslinking process can be initiated on-demand upon exposure to UV light. When the GelMA shell is crosslinked immediately after each single line is printed, distinct, non-intersecting channels are formed (left panel). However, if photocross-linking is initiated only after printing of both lines is completed, an open branch point is formed (right panel). (FIG. 9b) Neighboring, parallel channels can fuse together to form a single bulk structure with two internal channels (panel i). Various fused channel networks can be printed, including concentric, lattice, and triangular designs (panel ii). (FIG. 9c) Multiple, intertwined perfusable channels can be integrated within a single GelMA print, demonstrated here by a straight channel 1 wrapped by a spiral channel 2. The sacrificial inks for both channels were printed prior to photocrosslinking.

(FIG. 10a) Representative fluorescence images of a GelMA-fibronectin channel 3 days after seeding: (i) fluorescence image of viable (green, calcein AM) and dead (red, ethidium homodimer-1) HUVECs within the inner lumen (diameter=1.4 mm), with the outer vessel wall (thickness=0.8 mm) indicated by solid gray lines; (ii) magnified view of cells at the vessel wall interface, with the acquisition position indicated by dashed white box in (i). (FIG. 10b) 3D reconstruction of the HUVEC-lined vessel stained for F-actin cytoskeleton and nuclei. (FIG. 10c) HUVEC viability on GelMA and GelMA+fibronectin (FN) vessels 3 days post-seeding, ns: not significant.

(FIG. 11c) HUVEC cell areas on GelMA and GelMA+fibronectin (FN) vessels 3 days post-seeding, ****$p<0.0001$.

FIG. 12 depicts physical features of exemplary fabricated 3D perfusable networks.

DETAILED DESCRIPTION

Definitions

Figure 1A:
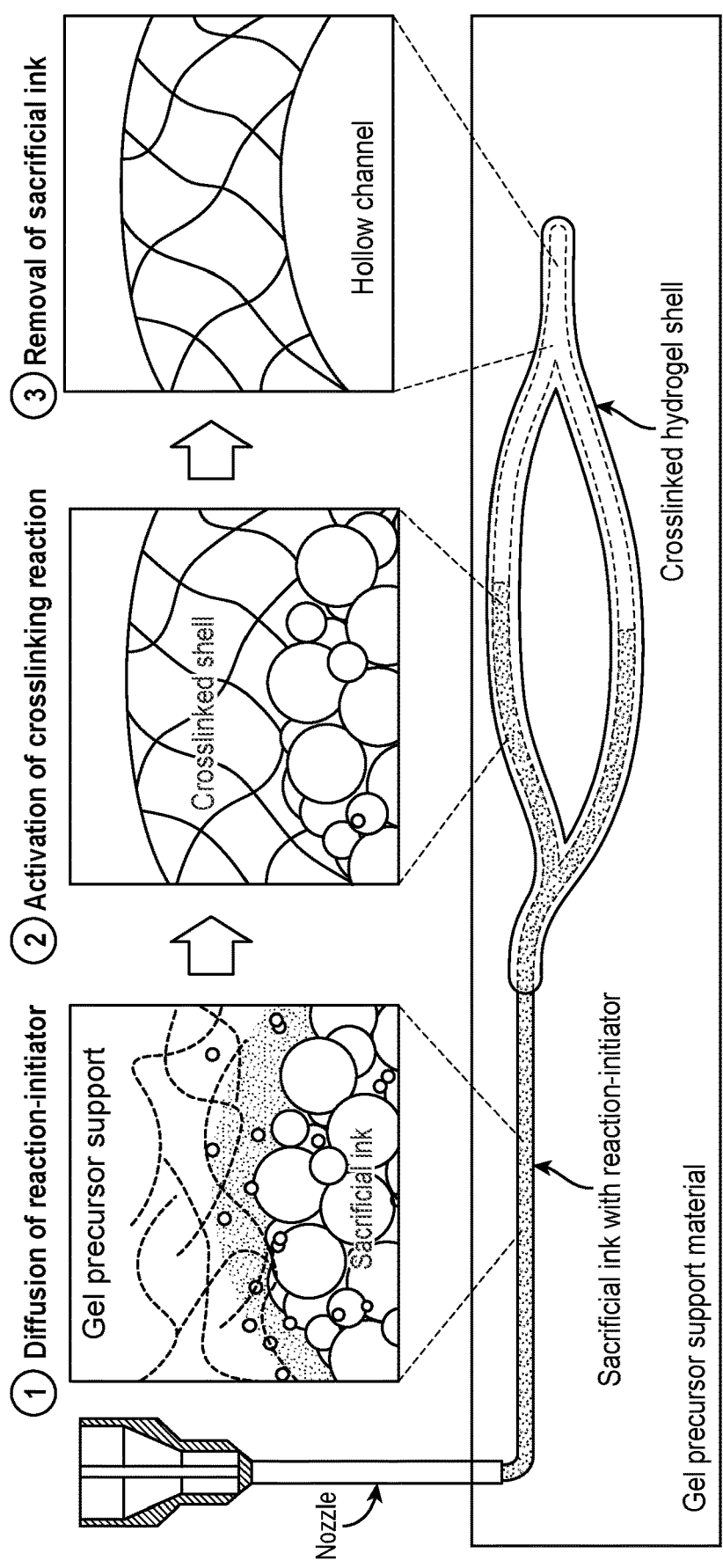
FIGS. 1A-1D. The Gelation of Uniform Interfacial Diffusant in Embedded 3D Printing (GUIDE-3DP) method.

Before embodiments of the present disclosure are further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Any methods and materials similar or equivalent to those described herein can also be used in the practice or testing of embodiments of the present disclosure.

It must be noted that as used herein and in the appended claims, the singular forms "a", "and", and "the" include plural referents unless the context clearly dictates otherwise. Thus, for example, reference to "a compound" includes not only a single compound but also a combination of two or more compounds, reference to "a substituent" includes a single substituent as well as two or more substituents, and the like.

In describing and claiming the present invention, certain terminology will be used in accordance with the definitions set out below. It will be appreciated that the definitions provided herein are not intended to be mutually exclusive. Accordingly, some chemical moieties may fall within the definition of more than one term.

As used herein, the phrases "for example," "for instance," "such as," or "including" are meant to introduce examples that further clarify more general subject matter. These examples are provided only as an aid for understanding the disclosure, and are not meant to be limiting in any fashion.

The term "hydrogel" is used in its conventional sense to refer to a material that absorbs a solvent (e.g. water), undergoes swelling without measurable dissolution, and maintains three-dimensional networks capable of reversible deformation. "Swelling" as referred to herein is meant the isotropic expansion of the hydrogel structure as water molecules diffuse throughout the internal volume of the hydrogel. The properties of copolymer hydrogels disclosed herein may be modulated as desired, by varying the amounts of each component, ratios of each component or the density of specific components, as described in greater detail below. The term hydrogel may include both desiccated and hydrated (e.g., solvent swollen) hydrogels.

In some embodiments of the invention the hydrogel provides a scaffold for cell growth, including growth of metabolically active cells, e.g. differentiating cells, etc. The cells may be grown in vitro, e.g. a culture of one or a plurality of cell types. Cells may also be grown in vivo, e.g. where a hydrogel provides a substrate for regenerative cell growth. Cells of interest include all types of cells, including without limitation, endothelial cells, muscle cells including smooth muscle cells, cardiomyocytes, etc., cells of an organ of interest, e.g. hepatocytes, stem cells, hematopoietic cells, stromal cells, fibroblasts, etc., plant cells, etc. The hydrogels used in the invention provide appropriate mechanical prop-erties for long term structural stability. Cells can be included in the printable composition, can be present in the support material, can be introduced into the channels after they are formed, etc. Cells can be present at any suitable concentra-tion, e.g. from about 10, $10^2$, $10^3$, $10^4$, $10^5$, $10^6$, $10^7$, or more cells/ml, or more for microbial cells.

The term "printable composition", "bioink" and "sacrifi-cial ink" as used herein refers to a composition that may be printed (i.e. 3D printed or bio-printed if containing cells). Sacrificial inks introduce patterns of removable material from the support material. When sacrificial inks are printed into a support, the support becomes a component of the final print, with channels left in the place of the sacrificial ink. Sacrificial inks are extruded during the printing process and therefore are subject to rheological design requirements, including (a) a high enough viscosity to prevent droplet formation, (b) a yield stress to remain solid-like prior to printing but then flow during extrusion, and (c) shear-thinning and self-healing behavior such that the viscosity decreases during extrusion through the needle and recovers after the strain is reduced. The hollow conduits formed by the sacrificial inks promote the transfer of oxygen and nutrients to cells, enabling the scale-up of prints with greater cell viability. Sacrificial inks can be used within bioinks (in a cellular composition), where the sacrificial ink component temporarily changes the overall bioink material properties to increase printability. Sacrificial inks have a removal mecha-nism to change the properties to those desired after printing.

The printable composition comprises a crosslinking ini-tiator that is able to diffuse from the printable composition into a medium directly surrounding the printable composi-tion (i.e. a support material). The printable composition also comprises a component, for example a gelatin microgel or poloxamer polymer, e.g. Pluronic F-127, that is temperature sensitive and melts at increased or decreased temperatures, respectively.

Poloxamer 407 (Pluronic F-127) is a hydrophilic non-ionic surfactant of the more general class of copolymers known as poloxamers. Poloxamer 407 is a triblock copoly-mer consisting of a central hydrophobic block of polypro-pylene glycol flanked by two hydrophilic blocks of poly-ethylene glycol (PEG). The approximate lengths of the two PEG blocks are 101 repeat units, while the approximate length of the propylene glycol block is 56 repeat units. This particular compound is also known by the BASF trade name Pluronic F-127 or by the Croda trade name Synperonic PE/F 127.

Poloxamer 407 is used in bioprinting applications due to its unique phase-change properties. In a 30% solution by weight, poloxamer 407 forms a gel solid at room tempera-ture but liquifies when chilled to 4° C. (39° F.). This allows poloxamer 407 to serve as a removable support material, particularly for creating hollow channels or cavities inside hydrogels.

Gelatin can be used as a sacrificial ink as well, e.g. as jammed microparticles. Gelatin melts at increased tempera-tures, e.g. from about 25-37° C. Support materials or sacrificial inks may comprise jammed microparticles. In such systems, hydrogel microparticles are typically mixed with an aqueous, cell-compatible buffer and then centrifuged to compact the particles into a jammed state, often called a slurry. The packed particles can temporarily fluidize as the printer nozzle passes through, becoming unjammed, and can then return to a jammed state once the shear stress from the nozzle is removed. Therefore, these materials exhibit the requisite yield stress and self-healing behavior needed to effectively support printed structure. The particle size may be less than about 50 μm, less than about 30 μm, less than about 20 μm to decrease the surface roughness.

The outer diameter of the channel shell is controlled by the diffusion time after printing, during which the reaction-initiators diffuse away from the sacrificial ink into the surrounding support material. The diffusion rate can be varied by changing the concentration of the reaction-initiator in the sacrificial ink, which concentration will depend on the specific reaction-initiator appropriate for the support mate-rial.

The term "support material" as used herein refers to a material that supports the printable composition of the present invention by reducing deformation due to gravity and enabling printing of complex structures. The support material can be a viscous liquid or semi-liquid medium that comprises a gelling agent and crosslinkable polymers. The gelling agent allows for the modulation of the viscosity of the support material. The crosslinkable polymers crosslink forming a solid of semi-solid structure or network upon contact with a crosslinking initiator such as the crosslinking initiators that diffuse outwardly from the printable compo-sition.

Most tissues in the body have stiffness values ranging from 0.1 to 100 kPa, so the support may provide similarly soft materials. Cells are also responsive to the mechanical properties of their surrounding matrix, and matrix stiffness has been shown to regulate cell spreading, migration, pro-liferation, gene expression, and differentiation. Therefore, the modulus of the support materials can be optimized both to elicit the desired cell phenotype and to enable continued stability of the printed structure. The support material may behave as a yield stress fluid. In the absence of an applied stress or at stresses below the yield stress, the material should exhibit solidlike properties. However, when a stress is applied above the yield stress, the medium should flow. In 3D bioprinting, this stress is applied by the tip of the printer nozzle. As the tip passes through the support bath, the material fluidizes locally and allows for controlled deposi-tion of the ink. Then, the support bath material can re-solidify around the printed ink filament. Since no additional stress is applied following printing, the bath then behaves like a solid once more, holding the printed structure in place.

Once the printer's nozzle tip passes through the support material, the material should ideally self-heal and re-solidify around the printed ink filament, holding it in place. The time it takes for the material to return to its initial state is referred to as the recovery time. The recovery time can be determined by measuring either the viscosity or shear moduli in response to a step down in shear rate. The test begins at low shear, then a high shear rate is applied, and finally the shear rate is decreased to the original value. The time it takes for the viscosity or modulus to return to its original value is reported as the recovery time. The time scale of this re-solidification process should ideally be minimized; there-fore, materials that display shorter recovery times may be chosen as support materials, since they can rapidly return to their initial solid-like state after abrupt changes in shear stress. This ensures that the printable material remains supported after printing.

The term "photocrosslinking" as used herein refers to the photoinduced formation of a covalent bond between two macromolecules or between two different parts of one macromolecule. Photo crosslinking occurs between photo crosslinkable polymers in the presence of a photo crosslinking initiator upon exposure to ultraviolet irradiation. Photocrosslinking allows greater control over crosslinking kinetics as a result of crosslinking reactions only being initiated upon exposure to ultraviolet irradiation. This paradigm allows for the fabrication of complex intersectional designs.

The term "small molecule crosslinking" as used herein refers to the small molecule induced formation of a covalent bond between two macromolecules or between two different parts of one macromolecule. Small molecule crosslinking occurs between small molecule crosslinkable monomers or polymers in the presence of a small molecule crosslinking initiator and is generally faster in the present invention because the enzymes used in enzymatic crosslinking have a higher molecular weight and therefore diffuse slower within the support material. Some forms of small molecule crosslinking require the addition of a co-initiator, such as Tetramethylethylenediamine (TEMED) and Bis Acrylamide, specifically when the small molecule crosslinkable monomer is acrylamide.

The term "enzymatic crosslinking" as used herein refers to the enzyme induced formation of a covalent bond between two macromolecules or between two different parts of one macromolecule. Enzymatic crosslinking occurs between enzymatic crosslinkable polymers in the presence of enzymatic crosslinking initiators and with respect to the present invention is generally slower than other crosslinking methods because the enzymes used for enzymatic crosslinking have a high molecular weight and thus diffuse slower within the support material. Enzymatic crosslinking is not toxic to biological materials which provides the advantage of being particularly cell compatible.

As used herein, the terms "determining," "measuring," "assessing," and "assaying" are used interchangeably and include both quantitative and qualitative determinations.

The terms "polypeptide" and "protein", used interchangeably herein, refer to a polymeric form of amino acids of any length, which can include coded and non-coded amino acids, chemically or biochemically modified or derivatized amino acids, and polypeptides having modified peptide backbones. The term includes fusion proteins, including, but not limited to, fusion proteins with a heterologous amino acid sequence, fusions with heterologous and native leader sequences, with or without N-terminal methionine residues; immunologically tagged proteins; fusion proteins with detectable fusion partners, e.g., fusion proteins including as a fusion partner a fluorescent protein, β-galactosidase, luciferase, etc.; and the like.

The terms "nucleic acid molecule" and "polynucleotide" are used interchangeably and refer to a polymeric form of nucleotides of any length, either deoxyribonucleotides or ribonucleotides, or analogs thereof. Polynucleotides may have any three-dimensional structure, and may perform any function, known or unknown. Non-limiting examples of polynucleotides include a gene, a gene fragment, exons, introns, messenger RNA (mRNA), transfer RNA, ribosomal RNA, ribozymes, cDNA, recombinant polynucleotides, branched polynucleotides, plasmids, vectors, isolated DNA of any sequence, control regions, isolated RNA of any sequence, nucleic acid probes, and primers. The nucleic acid molecule may be linear or circular.

The term "somatic cell" encompasses any cell in an organism that cannot give rise to all types of cells in an organism, i.e. it is not pluripotent. In other words, somatic cells are cells that have differentiated sufficiently that they will not naturally generate cells of all three germ layers of the body, i.e. ectoderm, mesoderm and endoderm.

The term "pluripotent" or "pluripotency" refers to cells with the ability to give rise to progeny that can undergo differentiation, under appropriate conditions, into cell types that collectively exhibit characteristics associated with cell lineages from the three germ layers (endoderm, mesoderm, and ectoderm). A "stem cell" is a cell characterized by the ability of self-renewal through mitotic cell division and the potential to differentiate into a tissue or an organ. Among mammalian stem cells, embryonic and somatic stem cells may be distinguished. Pluripotent stem cells, which include embryonic stem cells, embryonic germ cells and induced pluripotent cells, can contribute to tissues of a prenatal, postnatal or adult organism.

The terms "primary cells", "primary cell lines", and "primary cultures" are used interchangeably herein to refer to cells and cell cultures that have been derived from a subject and allowed to grow in vitro for a limited number of passages, i.e. splittings, of the culture. For example primary cultures are cultures that may have been passaged 0 times, 1 time, 2 times, 4 times, 5 times, 10 times, or 15 times, but not enough times go through the crisis stage. Typically, the primary cell lines of the present invention are maintained for fewer than 10 passages in vitro.

METHODS OF THE INVENTION

The methods disclosed utilize (1) support materials comprising crosslinkable polymers and gelling agents, and (2) printable compositions comprising a sacrificial ink, such as gelatin microgel or a poloxamer polymer, e.g. Pluronic F-127, etc.; and crosslinking initiators, to fabricate 3D perfusable networks.

In some embodiments, a method for fabricating a 3D perfusable network comprises (i) contacting a support material with an injection means, (ii) injecting a printable composition into the support material using the injection means, and (iii) moving the injection means in a desired 3D shape wherein the injection means continuously injects the printable composition into the support material. In such embodiments the printable composition comprises a sacrificial ink and a crosslinking initiator. In some embodiments, the method further comprises heating the support material to a temperature of from about 25° C. to about 37° C. after step (iii). In some embodiments, the method further comprises cooling the support material to a temperature of from about 10° C. to about 0° C. after step (iii). The support material comprises a crosslinkable polymer, and may further comprise a gelling agent (viscosity modulator). Injecting the printable composition into the support material allows for the diffusion of the crosslinking initiator from the printable composition into the support material, thereby initiating the crosslinking of the crosslinkable polymers around said printable composition, resulting in the formation of crosslinked networks where the printable composition is encased in the crosslinked polymers. Heating or cooling the support material results in the melting of the sacrificial ink encased in the crosslinked polymers, thereby generating 3D hollow (i.e. perfusable) networks. In some embodiments, the method further comprises exposing the support material to ultraviolet irradiation for photocrosslinking.

The methods disclosed herein may utilize a variety of injection means in order to inject the printable composition into the support materials. For example, the injection means includes, without limitation, a nozzle, a needle, a tube, etc. When a nozzle is used, the nozzle may be attached to a 3D printer that extrudes the printable composition into the nozzle. When a needle is used, the needle may be attached to a syringe that extrudes the printable composition into the needle.

The methods of the invention allow for a variety of crosslinking mechanisms to be utilized in fabrication of the 3D perfusable networks including, without limitation, photocrosslinking, crosslinking with small molecules and enzymatic crosslinking. Photocrosslinking mechanisms of the present disclosure utilize photocrosslinking polymers. Any photocrosslinking polymers deemed useful to the fabrication of the desired 3D perfusable network may be used. For instance, photocrosslinkable polymers include, without limitation, gelatin methacryloyl (GelMA), hyaluronic acid methacrylate (HAMA), poly(ethylene glycol) diacrylate (PEGDA), etc. When photocrosslinking is desired, a specific crosslinking initiator may be used. In some embodiments, the crosslinking initiator is LAP. When photocrosslinking is desired, the method further comprises exposing the support material to ultraviolet irradiation.

Crosslinking with small molecules may utilize small molecule crosslinkable monomers or polymers. Any small molecule crosslinkable monomer or polymer deemed useful to the fabrication of the desired 3D perfusable network may be used. For instance, small molecule crosslinkable monomers include, without limitation, acrylamide, and small molecule crosslinkable polymers include, without limitation, alginate. When crosslinking with small molecules is desired, a specific crosslinking initiator may be used. In some embodiments, when the small molecule crosslinkable polymer is alginate, the crosslinking initiator is $CaCl_2$. In some embodiments, when the small molecule crosslinkable monomer is acrylamide, the polymerization initiator is ammonium persulfate (APS). When the small molecule crosslinkable monomer is acrylamide, the support material further comprises a co-initiator. In some embodiments, the co-initiator is Tetramethylethylenediamine (TEMED) and the crosslinker is bis acrylamide.

Enzymatic crosslinking mechanisms of the present disclosure utilize enzymatic crosslinkable polymers. Any enzymatic crosslinkable polymer deemed useful to the fabrication of the desired 3D perfusable network may be used. For instance, enzymatic crosslinkable polymers include, without limitation fibrinogen, gelatin, etc. When enzymatic crosslinking is desired, a specific crosslinking initiator may be used. In some embodiments, when the enzymatic crosslinkable polymer is fibrinogen, the crosslinking initiator is thrombin. In some embodiments, when the enzymatic crosslinkable polymer is gelatin, the crosslinking initiator is transglutaminase. In some embodiments, when the enzymatic crosslinkable polymer is gelatin, the printable composition (sacrificial ink material) comprises Pluronic F-127 in place of gelatin microgel.

The crosslinking methods utilized in the fabrication of 3D perfusable networks provide distinct advantages relative to one another. Photocrosslinking allows greater control over crosslinking kinetics as a result of crosslinking reactions only being initiated upon exposure to ultraviolet irradiation. This paradigm allows for the fabrication of complex intersectional designs. Enzymatic crosslinking mechanisms are not toxic to biological materials making them particularly cell compatible.

The printable composition of the present disclosure comprises a gelatin microgel or Pluronic F-127, and a crosslinking initiator. The printable composition may utilize any crosslinking initiator deemed beneficial to the fabrication of the desired 3D perfusable network, particularly with respect to a chosen crosslinking mechanism. For example, the crosslinking initiator includes, without limitation, $CaCl_2$, ammonium persulfate (APS), LAP, thrombin, transglutaminase, etc.

The crosslinking initiator may be in any concentration that is sufficient to initiate crosslinking of the polymers within the support material. When the crosslinking initiator is $CaCl_2$, it may be in a concentration from at least about 0.1% to at least about 10% weight by volume of the composition. For instance, the concentration of CaCl2 may be from at least about 0.1% to at least about 2%, at least about 2% to at least about 4%, at least about 4% to at least about 6%, at least about 6% to at least about 8%, or at least about 8% to at least about 10% weight by volume of the composition.

When the crosslinking initiator is APS it may be in a concentration from at least about 5 mM to at least about 50 mM. For instance, the concentration of APS may be from at least about 5 mM to at least about 10 mM, at least about 10 mM to at least about 15 mM, at least about 15 mM to at least about 20 mM, at least about 20 mM to at least about 25 mM, at least about 25 mM to at least about 30 mM, at least about 30 mM to at least about 35 mM, at least about 35 mM to at least about 40 mM, at least about 40 mM to at least about 45 mM, or at least about 45 mM to at least about 50 mM.

When the crosslinking initiator is LAP it may be in a concentration from at least about 1 mM to at least about 10 mM. For instance, the concentration of LAP may be from at least about 1 mM to at least about 2 mM, 2 mM to at least about 3 mM, 3 mM to at least about 4 mM, 4 mM to at least about 5 mM, 5 mM to at least about 6 mM, 6 mM to at least about 7 mM, 7 mM to at least about 8 mM, 8 mM to at least about 9 mM, or 9 mM to at least about 10 mM.

When the crosslinking initiator is thrombin it may be in a concentration from at least about $100 \, Uml^{-1}$ to at least about $1000 \, Uml^{-1}$. For instance, the concentration of thrombin may be in a concentration from at least about $100 \, Uml^{-1}$ to at least about $200 \, Uml^{-1}$, at least about $200 \, Uml^{-1}$ to at least about $300 \, Uml^{-1}$, at least about $300 \, Uml^{-1}$ to at least about $400 \, Uml^{-1}$, at least about $400 \, Uml^{-1}$ to at least about $500 \, Uml^{-1}$, at least about $500 \, Uml^{-1}$ to at least about $600 \, Uml^{-1}$, at least about $600 \, Uml^{-1}$ to at least about $700 \, Uml^{-1}$, at least about $700 \, Uml^{-1}$ to at least about $800 \, Uml^{-1}$, at least about $800 \, Uml^{-1}$ to at least about $900 \, Uml^{-1}$, or at least about $900 \, Uml^{-1}$ to at least about $1000 \, Uml^{-1}$.

When the crosslinking initiator is transglutaminase it may be in a concentration from at least about 0.1% to at least about 10% weight by volume of the composition. For instance, the concentration of transglutaminase may be from at least about 0.1% to at least about 2%, at least about 2% to at least about 4%, at least about 4% to at least about 6%, at least about 6% to at least about 8%, or at least about 8% to at least about 10% weight by volume of the composition.

In some embodiments, the printable composition further comprises cells. The cells may be any cells desired to be seeded into the 3D perfusable network. The cells may be from any mammal, including humans, primates, domestic and farm animals, and zoo, laboratory or pet animals, such as dogs, cats, cattle, horses, sheep, pigs, goats, rabbits, rats, mice etc. They may be established cell lines or they may be primary cells, where "primary cells", "primary cell lines", and "primary cultures" are used interchangeably herein to refer to cells and cells cultures that have been derived from a subject and allowed to grow in vitro for a limited number of passages.

The cells may be isolated from fresh or frozen cells, which may be from a neonate, a juvenile or an adult, and from tissues including skin, muscle, bone marrow, peripheral blood, umbilical cord blood, spleen, liver, pancreas, lung, intestine, stomach, adipose, and other differentiated tissues. The tissue may be obtained by biopsy or aphoresis from a live donor, or obtained from a dead or dying donor within about 48 hours of death, or freshly frozen tissue, tissue frozen within about 12 hours of death and maintained at below about −20° C., usually at about liquid nitrogen temperature (−190° C.) indefinitely. For isolation of cells from tissue, an appropriate solution may be used for dispersion or suspension. Such solution will generally be a balanced salt solution, e.g. normal saline, PBS, Hank's balanced salt solution, etc., conveniently supplemented with fetal calf serum or other naturally occurring factors, in conjunction with an acceptable buffer at low concentration, generally from 5-25 mM. Convenient buffers include HEPES, phosphate buffers, lactate buffers, etc.

The support material of the present disclosure comprises a crosslinkable monomer or polymer and a gelling agent. In some embodiments, the gelling agent is aristoflex AVC. In some embodiments, the support material further comprises a co-initiator. In some embodiments, the co-initiator is Tetramethylethylenediamine (TEMED) and Bis Acrylamide. The support material may utilize any crosslinkable monomer or polymer deemed beneficial to the fabrication of the desired 3D perfusable network, particularly with respect to a chosen crosslinking mechanism. For example, the crosslinkable monomer or polymer includes, without limitation, alginate, acrylamide, gelatin methacryloyl (GelMA), hyaluronic acid methacrylate (MeHA), poly(ethylene glycol) diacrylate (PEGDA), fibrinogen, gelatin, etc.

The crosslinkable monomer or polymer may be in any concentration that is sufficient to generate 3D perfusable networks of the polymers within the support materials.

When the crosslinkable polymer is alginate, it may be in a concentration from at least about to at least about 10% weight by volume of the composition. For instance, the concentration of alginate may be from at least about 0.1% to at least about 2%, at least about 2% to at least about 4%, at least about 4% to at least about 6%, at least about 6% to at least about 8%, or at least about 8% to at least about 10% weight by volume of the composition.

When the crosslinkable monomer is acrylamide it may be in a concentration from at least about 10% to at least about 50% weight by volume of the composition. For instance, the concentration of acrylamide may be from at least about 10% to at least about 20%, at least about 20% to at least about 30%, at least about 30% to at least about 40%, or at least about 40% to at least about 50% weight by volume of the composition.

When the crosslinkable polymer is GelMA it may be in a concentration from at least about 1% to at least about 20% weight by volume of the composition. For instance, the concentration of GelMA may be from at least about 1% to at least about 2%, at least about 2% to at least about 4%, at least about 4% to at least about 6%, at least about 6% to at least about 8%, or at least about 8% to at least about 10%, 10% to at least about 12%, at least about 12% to at least about 14%, at least about 14% to at least about 16%, at least about 16% to at least about 18%, or at least about 18% to at least about 20% weight by volume of the composition.

When the crosslinkable polymer is HAMA it may be in a concentration from at least about to at least about 10% weight by volume of the composition. For instance, the concentration of HAMA may be from at least about 0.1% to at least about 2%, at least about 2% to at least about 4%, at least about 4% to at least about 6%, at least about 6% to at least about 8%, or at least about 8% to at least about 10% weight by volume of the composition.

When the crosslinkable polymer is PEGDA it may be in a concentration from at least about 1% to at least about 20% weight by volume of the composition. For instance, the concentration of PEGDA may be from at least about 1% to at least about 2%, at least about 2% to at least about 4%, at least about 4% to at least about 6%, at least about 6% to at least about 8%, or at least about 8% to at least about 10%, 10% to at least about 12%, at least about 12% to at least about 14%, at least about 14% to at least about 16%, at least about 16% to at least about 18%, or at least about 18% to at least about 20% weight by volume of the composition.

When the crosslinkable polymer is fibrinogen it may be in a concentration from at least about 1% to at least about 20% weight by volume of the composition. For instance, the concentration of fibrinogen may be from at least about 1% to at least about 2%, at least about 2% to at least about 4%, at least about 4% to at least about 6%, at least about 6% to at least about 8%, or at least about 8% to at least about 10%, 10% to at least about 12%, at least about 12% to at least about 14%, at least about 14% to at least about 16%, at least about 16% to at least about 18%, or at least about 18% to at least about 20% weight by volume of the composition.

When the crosslinkable polymer is gelatin it may be in a concentration from at least about 1% to at least about 20% weight by volume of the composition. For instance, the concentration of gelatin may be from at least about 1% to at least about 2%, at least about 2% to at least about 4%, at least about 4% to at least about 6%, at least about 6% to at least about 8%, or at least about 8% to at least about 10%, 10% to at least about 12%, at least about 12% to at least about 14%, at least about 14% to at least about 16%, at least about 16% to at least about 18%, or at least about 18% to at least about 20% weight by volume of the composition. Gelatin microbeads may be used.

The methods disclosed herein are capable of fabricating 3D perfusable networks comprising various physical features. In some embodiments, the method is capable of producing a 3D perfusable network comprising fused intersection wherein a material, i.e. a gas or a liquid, is able to traverse said fused intersection. When the 3D perfusable network comprises fused intersections, the printable composition comprises a photocrosslinking initiator and a photocrosslinkable polymer. In some embodiments, the method is capable of producing a 3D perfusable network comprising non-fused intersections wherein a material, i.e. a gas or a liquid, is not able to traverse said non-fused intersection. In some embodiments, when the 3D perfusable network comprises non-fused intersections, the printable composition comprises a crosslinking small molecule initiator and a small molecule crosslinkable monomer or polymer. In some embodiments, when the 3D perfusable network comprises non-fused intersections, the printable composition comprises an enzymatic crosslinking initiator and an enzymatic crosslinkable polymer.

In some embodiments, the 3D perfusable networks comprise a smooth and continuous exterior. In some embodiments, the method is capable of producing 3D perfusable networks comprising variable diameters within the network. For instance, the diameter may vary from at least about 50 µm to at least about 2000 µm. In some embodiments, the method is capable of producing a 3D perfusable network comprising angles from at least about 10° to at least about 180°.

In another aspect of the invention, a composition is provided. In some embodiments, the composition comprises a printable composition. In some embodiments, the printable composition comprises a gelatin microgel or Pluronic F-127, and a crosslinking initiator. In some embodiments, the printable composition further comprises a surfactant. In some embodiments, the printable composition further comprises cells. In some embodiments, the composition comprises a support material. In some embodiments, the support material comprises a crosslinkable polymer and a gelling agent. In some embodiments, the gelling agent is aristoflex AVC. In some embodiments, the support material further comprises a co-initiator. In some embodiments, the co-initiator is Tetramethylethylenediamine (TEMED) and Bis Acrylamide.

EXPERIMENTAL

Example 1

Small molecule crosslinking, photo crosslinking and enzymatic crosslinking mechanisms were employed to fabricate 3D perfusable networks according to the compositions disclosed in the table. The sacrificial ink was injected into the support bath through a nozzle connected to a MakerGear M2 Rev E plastic 3D printer modified to allow two-material bioprinting. The nozzle was then moved in the desired shape. Following injecting the crosslinking reaction was allowed to occur for 3-15 minutes depending on the desired shell thickness and crosslinking mechanism. For photocrosslinking, the support material was exposed to ultraviolet irradiation to initiate the crosslinking reaction. Following the crosslinking reaction the support material was then heated to 37° C. to melt the gelatin microgel or cooled to 4° C. to melt the Pluronic F-127 to produce hollow 3D perfusable networks.

deposited lines. The composition also comprised Rhodamine B so that the surface morphology could be observed using a Leica THUNDER fluorescence microscope. For the helix based channel, the composition was deposited using GelMA inks. The composition was deposited in a single continuous line to form a channel within the center of the helix. The composition also comprised Rhodamine B so that the surface morphology could be observed using an Leica THUNDER fluorescence microscope. For the GUIDE-3DP approach, the composition was deposited using 8 wt % gelatin microgel with 2 mM LAP. The composition was deposited as described for FIG. 1. The composition also comprised Rhodamine B dye so that the surface morphology could be observed using a Leica THUNDER fluorescence microscope.

Figures 9A, 9B, 9C:
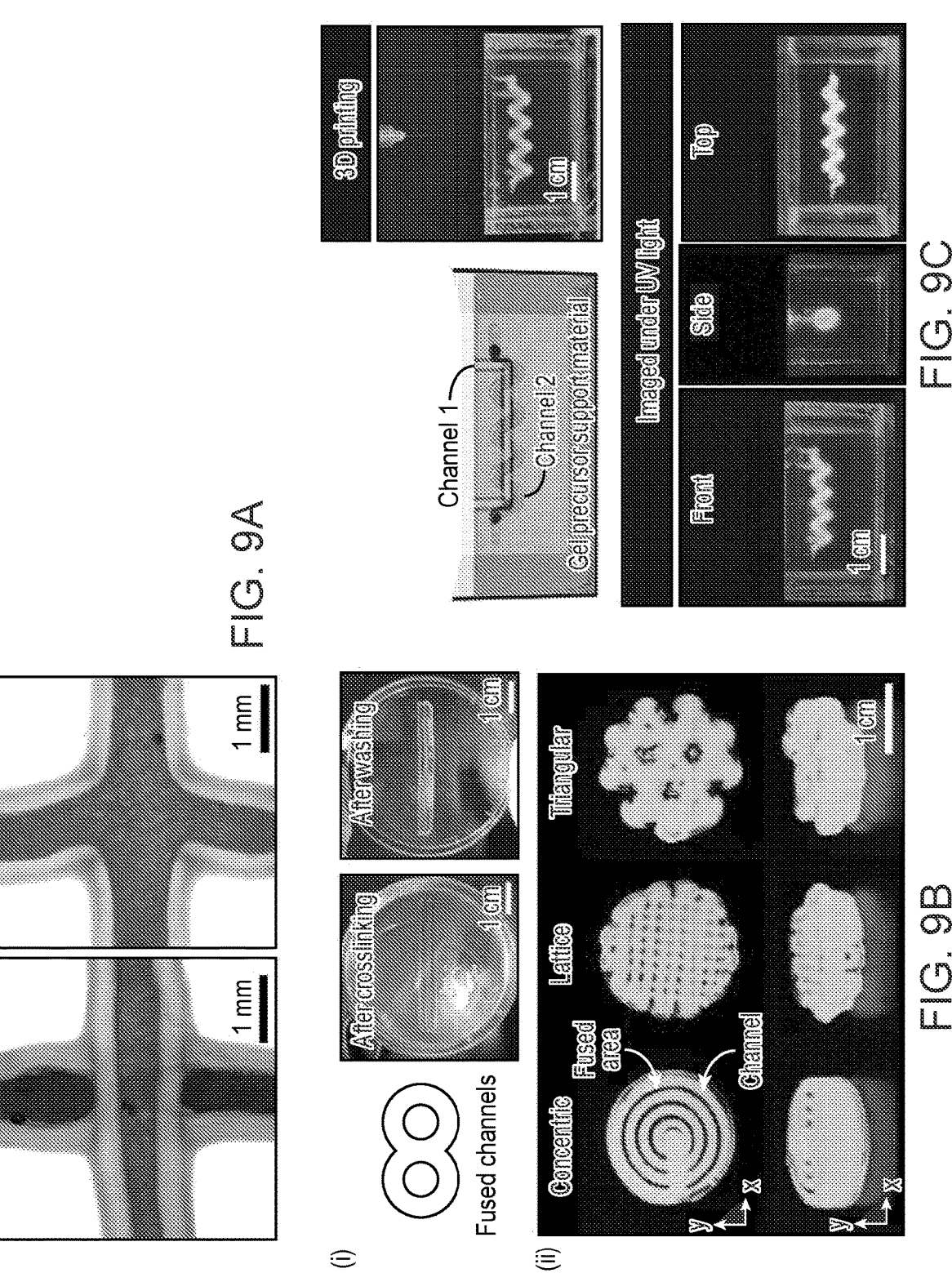
FIG. 9A-9C.

As shown in FIG. 9A, intersections were fabricated using either enzymatic (i.e. using the alginate based composition described in Table 1) or photocrosslinking mechanisms (i.e. GelMA based composition described in Table 1). Following the fabrication of the 3D perfusable network, red dye was passed through the 3D perfusable network. For the enzymatic crosslinking 3D perfusable network, blue dye was used to show non-fused intersections. Photocrosslinking was used to show fused intersections.

FIG. 4F shows the generation of a 3D perfusable network based on the coronary artery and vein networks of the heart. Photocrosslinking mechanisms were employed where the sacrificial ink was deposited using a needle. The compositions employed were 8 wt % gelatin microgel with 20 mM LAP for sacrificial ink and 10 wt % GelMA with 2 wt % Aristoflex AVC for gel precursor support. Red and blue fluorescent microparticles were used to show the two different 3D perfusable networks.

Figures 4A, 4B, 4C, 4D, 4E:
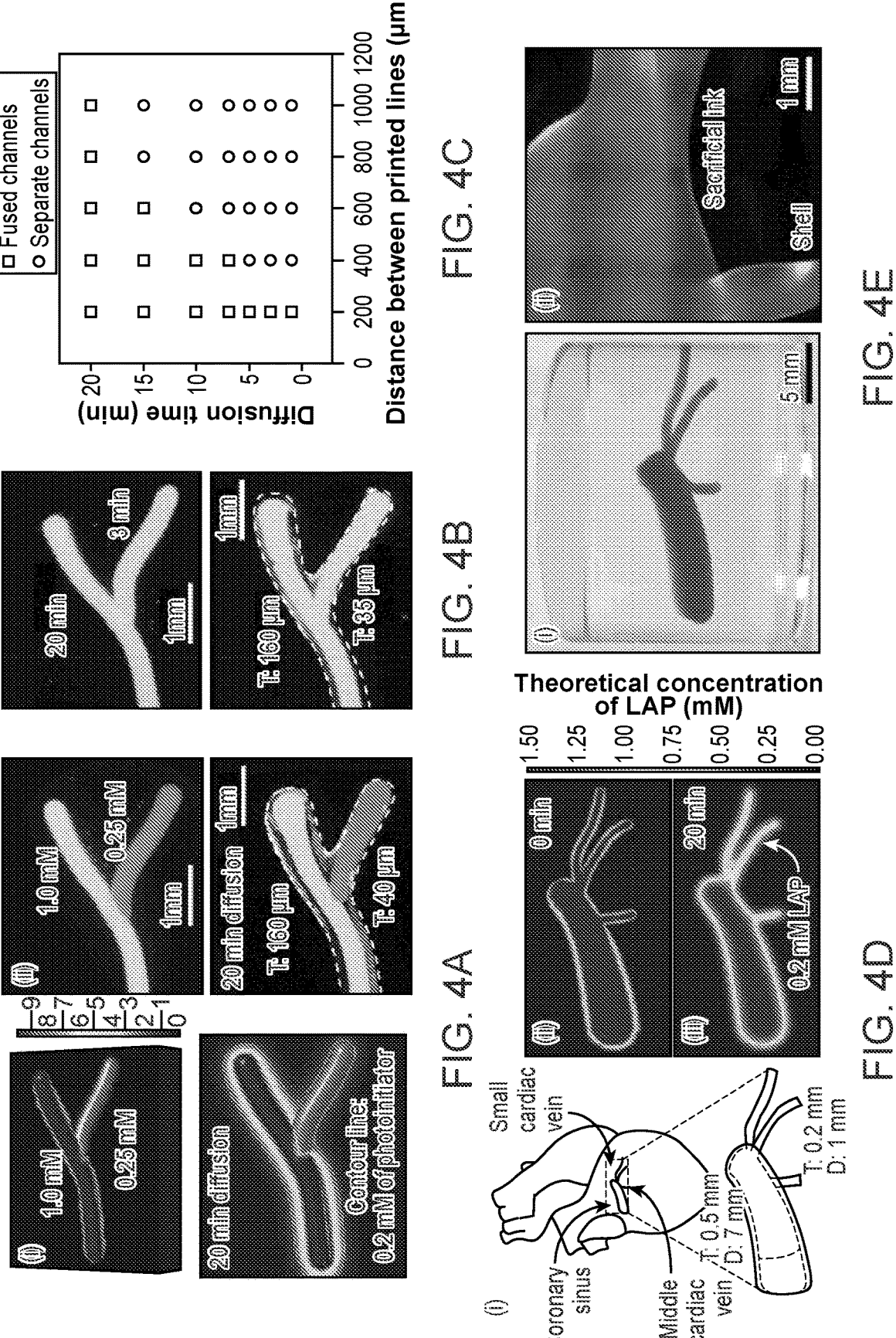

As shown in FIG. 4D, a 3D perfusable network with a variable diameter was fabricated. The larger lumen diameter was 7 mm and the smaller lumen diameter was 1 mm. The 3D perfusable network was made using photocrosslinking mechanisms. The concentration of the LAP crosslinking initiator was visualized using the commercial finite element software COMSOL Multiphysics®. The diffusion of LAP occurred in a predictable manner.

TABLE 1

| | Support Bath | | | Sacrificial Ink | | |
|---|---|---|---|---|---|---|
| Mechanism | Crosslinkable Polymers (%) | Co-initiator (mM) | Aristoflex AVC (%) | Gelatin Microgel (%) | Pluronic F-127 (%) | Crosslinker |
| Ca²⁺ | 2 (Alginate) | — | 2 | 8 | — | 1% CaCl₂ |
| APS | 20 (Acrylamide) | 20 mM TEMD 0.1% Bis Acryamide | 2 | 8 | — | 20 mM APS |
| Photo crosslinking | 10 (GelMA) | — | 2 | 8 | — | 2 mM LAP |
| | 2 (HAMA) | — | 2 | 8 | — | 2 mM LAP |
| | 5 (PEGDA) | — | 2 | 8 | — | 2 mM LAP |
| Enzymatic crosslinking | 5 (Fibrinogen) | — | 2 | 8 | — | 500 Uml⁻¹ Thrombin |
| | 10 (Gelatin) | — | 2 | — | 24 | 1% Transglutaminase |

Figures 1B, 1C, 1D:
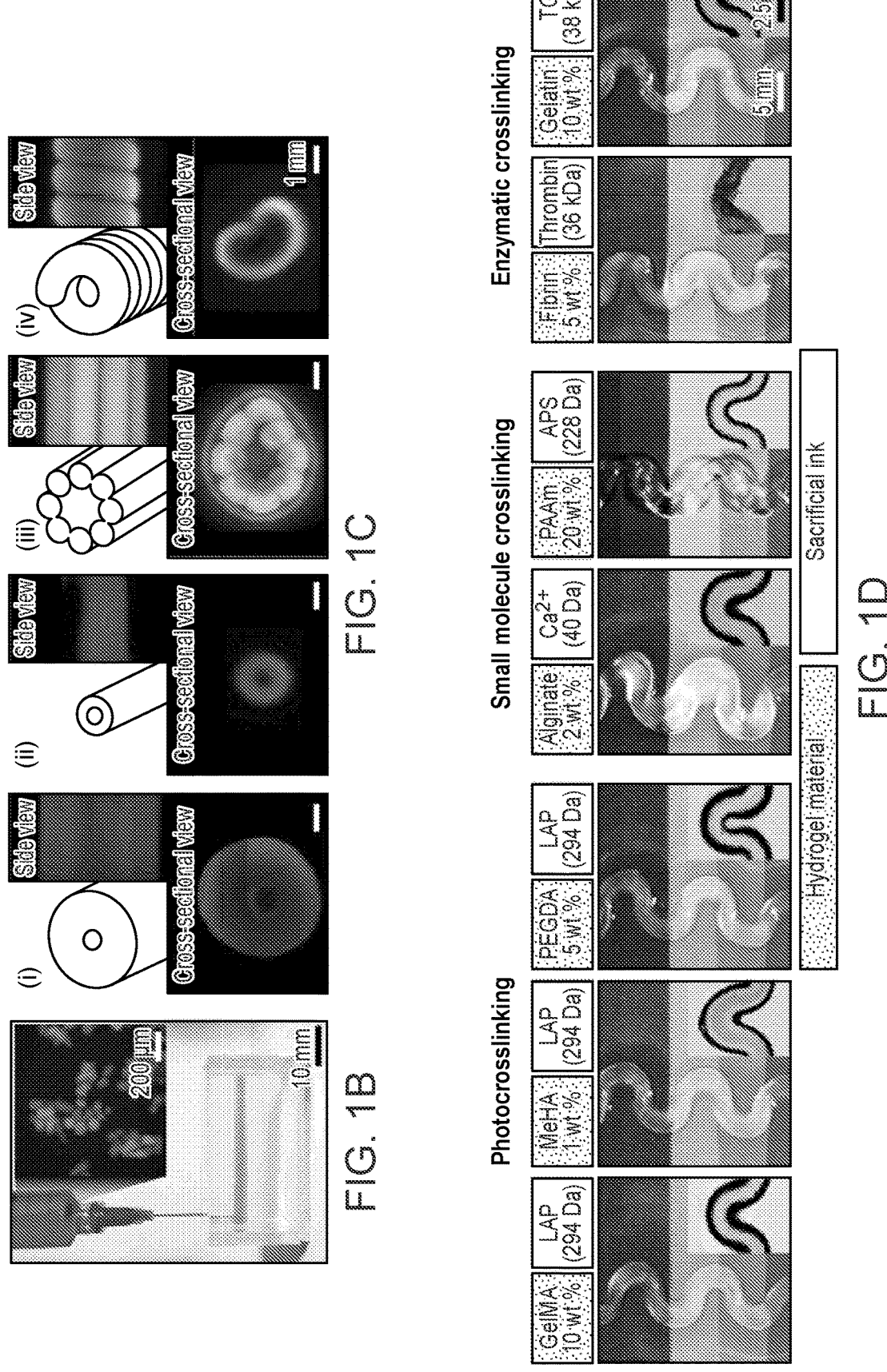
Figure 12:
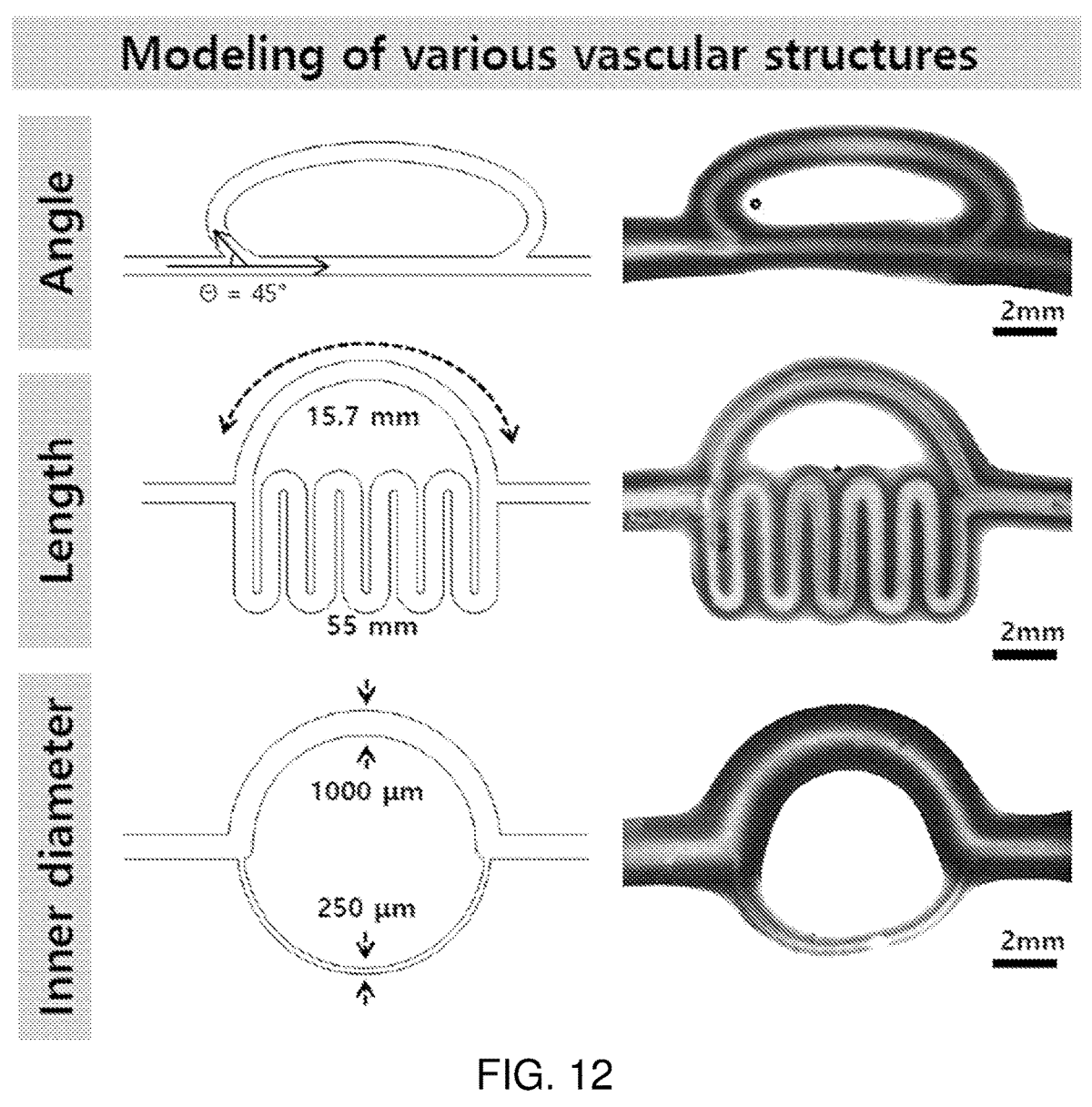

FIG. 1C shows surface morphology of 3D perfusable networks generated using different methods. Photocrosslinking mechanisms were employed to generate the 3D perfusable network using the corresponding compositions disclosed in Table 1. For the line based channel, the composition was deposited using GelMA inks. The composition was deposited in multiple lines to form a channel within the As shown in FIG. 12, 3D perfusable networks are fabricated with specific angles, varying lengths and varying diameters. A green fluorescent microparticle dispersion was passed through different network structures to show how the different structures result in inhomogeneous flow dynamics.

The 3D perfusable networks were seeded with cells using two different methods. The first method was seeding the 3D perfusable networks using a pipet. The second method was seeding the 3D perfusable networks using a 3D bioprinting with the GUIDE-3DP approach. For GUIDE-3DP, the cells were contained in the sacrificial ink during the fabrication of the 3D perfusable network. Specific regions of the varying structures were visualized to show the differences in cell seeding techniques. GUIDE-3DP resulted in a greater distribution of cells throughout the varying structures. The cells used were Human umbilical vein endothelial cells (HUVEC, PromoCell) which were first expanded in endothelial growth medium-2 (EGM-2 bullet kit, Lonza) before being dissociated, counted, and seeded/printed.

Example 2

While the human body has many different examples of perfusable structures with complex geometries, biofabrication methods to replicate this complexity are still lacking. Specifically, the fabrication of self-supporting, branched networks with multiple channel diameters is particularly challenging. Here, we present the Gelation of Uniform Interfacial Diffusant in Embedded 3D Printing (GUIDE-3DP) approach for constructing perfusable networks of interconnected channels with precise control over branching geometries and vessel sizes. To achieve user-specified channel dimensions, this technique leverages the predictable diffusion of crosslinking reaction-initiators released from sacrificial inks printed within a hydrogel precursor. We demonstrate the versatility of GUIDE-3DP to be adapted for use with diverse physiochemical crosslinking mechanisms by designing seven printable material systems. Importantly, GUIDE-3DP allows for the independent tunability of both the inner and outer diameters of the printed channels and the ability to fabricate seamless junctions at branch points. This 3D bioprinting platform is uniquely suited for fabricating lumenized structures with complex shapes characteristic of multiple hollow vessels throughout the body. As an exemplary application, we demonstrate the fabrication of vasculature-like networks lined with endothelial cells. GUIDE-3DP represents an important advance toward the fabrication of self-supporting, physiologically relevant networks with intricate and perfusable geometries.

Channels with intricate geometries are critical for the function of many tissues throughout the human body, including vascular networks, lymphatic vessels, airway channels, and the gastrointestinal tract. These naturally evolved, perfusable geometries have inspired bioengineers to fabricate mimetic structures for use in organ-on-a-chip models, as tissue engineered therapies, and for studying the role of physical forces in regulating healthy and diseased cellular function.

Compared to micromolding or microfluidics, 3D printing of biomaterial inks has emerged as a technique to create perfusable networks with user-specified channel paths that can be easily reconfigured. In one bioprinting strategy for channel formation, a tube-like structure is created through direct layer-by-layer printing of the channel walls. While this allows for fabrication of branched networks, the structures are prone to leakage due to insufficient adhesion between layers, and the resulting surfaces and interfaces are typically not smooth. To address these limitations, coaxial extrusion can be used to fabricate perfusable channels by directly printing hollow filaments from concentric nozzles. However, since the inner and outer diameters are set by the nozzle geometry, the final printed structure cannot include interconnected branch points. This technique is therefore limited to single-lumen geometries of fixed diameter. As an alternative approach, extrusion printing of a sacrificial ink enables patterning of void spaces within a bulk material to form interconnected lumens with smooth inner surfaces. In contrast to core-shell extrusion, this sacrificial ink strategy results in perfusable structures without a vessel-like shell. As such, this method cannot be used to form self-supporting networks.

To enable the biofabrication of perfusable, self-supporting channels with interconnected branch points and predictable, user-specified diameters, we developed a new strategy we term Gelation of Uniform Interfacial Diffusant in Embedded 3D Printing (GUIDE-3DP). We demonstrate the versatility of this platform to be adapted for multiple materials and physiochemical hydrogel crosslinking mechanisms, the independent tunability of both the inner tube diameter and outer shell diameter of printed channels, and the ability to fabricate seamless junctions at branch points. Finally, to exemplify the use of GUIDE-3DP for creating physiologically relevant structures, networks of perfusable channels are fabricated with an endothelial cell lining to mimic vasculature.

Results and Discussion

Embedded 3D printing is an additive manufacturing strategy in which inks are extruded within a support material, decreasing deformation due to gravity or surface tension and thus enabling the printing of inks into complex geometries. In our GUIDE-3DP technique, we leverage the predictable diffusion of crosslinking reaction-initiators, released from sacrificial inks within the support material, to rapidly create perfusable, self-supporting networks with precise control over the branching geometry and vessel dimensions (FIG. 1). In this strategy, a crosslinkable gel precursor is employed both as the support matrix for microextrusion printing as well as the material that eventually comprises the vessel walls. A sacrificial ink containing a cytocompatible reaction-initiator is printed into the gel precursor. Following printing, the reaction-initiators diffuse radially and uniformly across the ink interface and into the surrounding gel precursor (FIG. 1a, left panel). The crosslinking reaction occurs only in regions where the gel precursor is in contact with the reaction-initiator, which can be selected to either induce spontaneous crosslinking or to require an external trigger such as light activation (FIG. 1a, middle panel). Finally, the sacrificial ink and uncrosslinked support material are removed, resulting in a self-supporting, perfusable printed structure (FIG. 1a, right panel).

As a first demonstration, light-crosslinkable gelatin methacryloyl (GelMA) was selected as the gel precursor support material with a slurry of gelatin microparticles loaded with a photoinitiator (lithium phenyl-2,4,6-trimethylbenzoylphosphinate, LAP) as the sacrificial ink. When a filament of the sacrificial ink is printed within the GelMA support material (FIG. 1b), the encapsulated reaction-initiator (i.e., LAP) begins to diffuse radially away from the ink. Upon LAP activation with ultraviolet (UV) light, a continuous shell of crosslinked GelMA is formed around the sacrificial ink, which can then be removed after melting, resulting in a perfusable channel (FIG. 1c, panels i and ii). In contrast to the GUIDE-3DP approach, previous layer-by-layer demonstrations of printing self-supporting channels typically result in surfaces that are discontinuous and prone to defects that may cause leakage due to gaps or delamination of the additive layers (FIG. 1c, panels iii and iv). Moreover, these traditional additive manufacturing strategies are time-intensive, since multiple passes are required to print a single channel, and limited in their ability to tune the channel dimensions, since the wall thickness cannot be less than the thickness of a single printed filament. GUIDE-3DP overcomes all three of these constraints. The channel surface is uniform since the diffusion of the reaction-initiator into the support material is uniform; the total print time is reduced since the nozzle moves along the print path only once for a single channel; and the shell thickness is controlled by setting the diffusion time. Moreover, the GUIDE-3DP strategy is amenable to a broad range of polymers and crosslinking mechanisms. To demonstrate this, we formulated seven different gel precursor materials to enable crosslinking by the following mechanisms: (1) photocrosslinking with UV light for GelMA, hyaluronic acid methacrylate (MeHA), and poly(ethylene glycol) diacrylate (PEGDA), (2) crosslinking with small molecules for alginate and polyacrylamide (PAAm), and (3) enzymatic crosslinking for fibrin and gelatin. All seven distinct support material/sacrificial ink combinations were successfully used for GUIDE-3DP fabrication of perfusable structures (FIG. 1d). A table detailing the material composition and printing parameters is presented in Table 2.

Figures 2A, 2B, 2C, 2D, 2E, 2F:
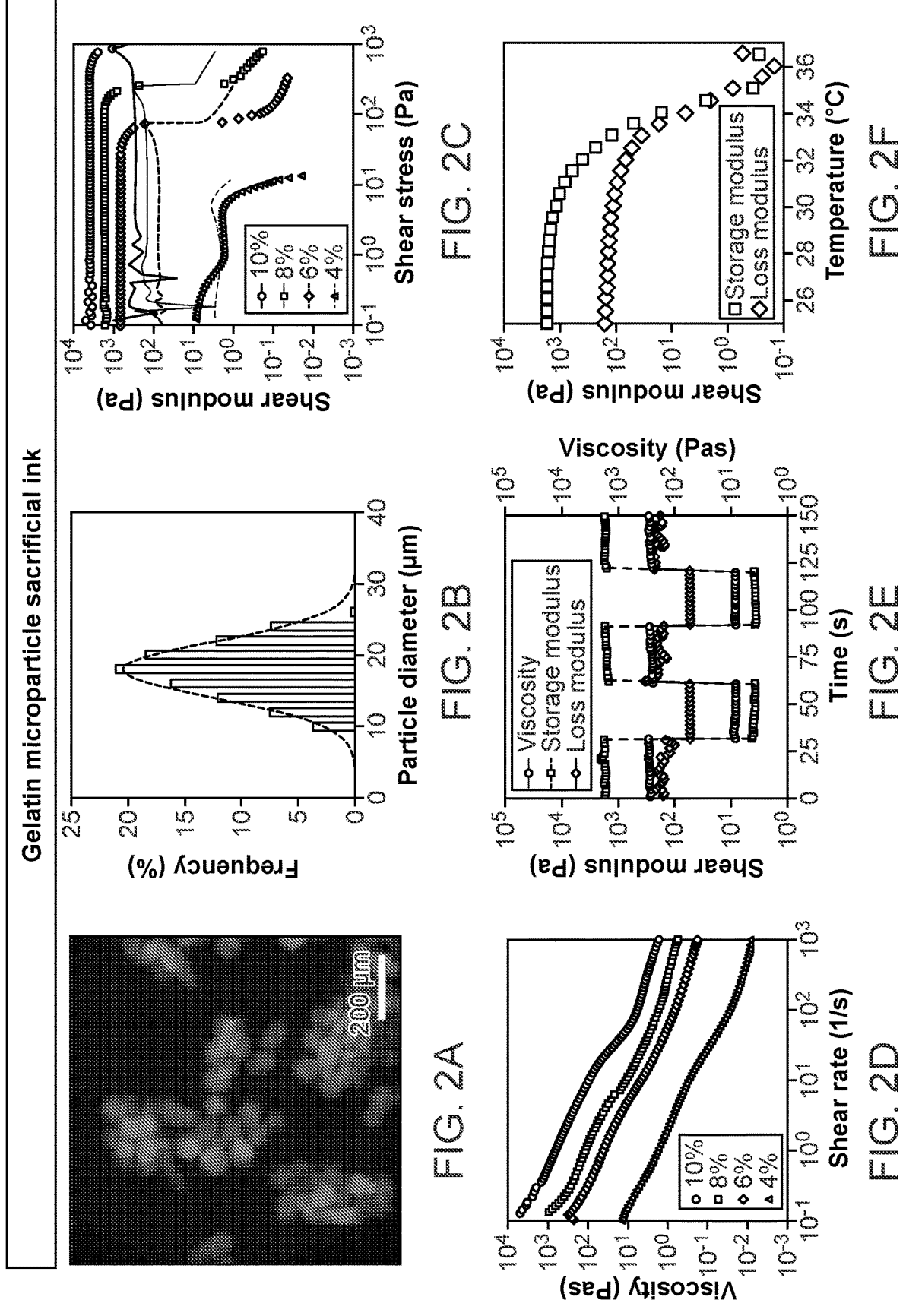

The GUIDE-3DP strategy is enabled by the material properties of the sacrificial ink and gel precursor support material. As the hydrogel component of the sacrificial inks for GUIDE-3DP, we chose a slurry of gelatin microparticles (FIG. 2). The gelatin microparticles (mean diameter of $18.0 \pm 4.0$ μm) were fabricated with complex coacervation and concentrated by filtration to form a jammed microparticle ink (FIG. 2a-b). After comparing the rheological analysis of concentrations ranging from 4-10 wt %, the 8% gelatin microgel ink was identified as having the viscoelastic properties required for printing smooth filaments within the GelMA support material (FIG. 6). Specifically, the 8 wt % gelatin microparticle slurry demonstrated important sacrificial ink characteristics, including (1) yield stress and shear-thinning behavior (FIG. 2c-d), which enables extrusion through the print nozzle; (2) rapid self-healing (FIG. 2e), which limits ink spreading and improves print resolution; and (3) controllable sol-gel phase transition, melting at temperatures above 34° C. (FIG. 2f), which facilitates its removal from the final print.

We next demonstrated that by changing the reaction-initiator within the sacrificial ink, we can construct prints with a variety of gel precursors and crosslinking mechanisms using GUIDE-3DP (FIG. 2g). We achieved suitable rheological properties of each gel precursor support material (alginate, PAAm, GelMA, MeHA, PEGDA, fibrin, and gelatin) by adding Aristoflex Ammonium Acryloyldimethyltaurate/VC Copolymer (AVC) as a viscosity modifier (2 wt %) (FIGS. 2h-j; 7). For each crosslinking system, a bespoke set of reaction-initiator molecules was designed to diffuse across the interface between the printed ink and the support material (Table 2). Specifically, for the photocrosslinkable gel precursor support materials, the sacrificial gelatin microparticle ink was loaded with LAP (294 Da) as a photoinitiator, while $Ca^{2+}$ (40 Da) was loaded as the small molecule for alginate, a cation-crosslinked gel precursor material. As PAAm requires both polymerization and crosslinking to occur simultaneously, the polymerization initiator ammonium persulfate (APS, 228 Da) and the crosslinker bis-acrylamide were included in the gelatin sacrificial ink and acrylamide support material, respectively. For the enzymatically crosslinked materials, the sacrificial ink was loaded with the enzyme thrombin (36 kDa) or transglutaminase (38 kDa) to induce gelation of fibrin or gelatin, respectively. Importantly, to avoid the transglutaminasemediated crosslinking of the sacrificial ink for the gelatin support material, the sacrificial ink used was Pluronic F-127 (24 wt %) instead of gelatin microparticles. Pluronic F-127 is a thermoreversible triblock copolymer commonly used as a sacrificial hydrogel in 3D bioprinting applications.

Both the inner and outer shell diameters of GUIDE-3DP channels are highly tunable, since the inner diameter is the same as the diameter of the printed sacrificial ink filament, and the outer shell diameter is dependent on the diffusion time (FIG. 3). GUIDE-3DP offers two strategies for dynamically varying the ink filament diameter during direct writing. In one strategy, the applied dosing pressure is varied while the writing speed is held constant (FIG. 3a-b); in the other strategy, the applied pressure is held constant while the writing speed is varied (FIG. 3c). In both cases, the diameter of the printed ink filament dictates the inner diameter of the crosslinked GelMA tubes. The ability to control the inner diameter with the GUIDE-3DP strategy enables facile fabrication of biologically inspired, complex perfusable structures. For example, many perfusable structures in nature have inner diameters that are not constant, which can be replicated using the GUIDE-3DP strategy. As a demonstration, we created a model of the large intestine, which has a single lumen that is segmented into "pouch-like" haustra (FIG. 3d), by alternating the print speed of the sacrificial ink (1 mm/s, 40 psi for an inner diameter of 4.5 mm; 2 mm/s, 40 psi for an inner diameter of 3.5 mm). As a second demonstration, we printed a perfusable network with both diverging and converging vessel branch points that emulate the natural branching observed in vascular networks in vivo, with parent vessels of larger inner diameter (2.5 mm) and daughter vessels of smaller inner diameter (1.5 mm) (FIG. 3e). Upon gelatin melting and extraction of the fabricated GelMA structures, both the large intestine model and the vascular network model were readily perfusable with dye.

Figures 3F, 3G, 3H, 3I, 3J, 3K:
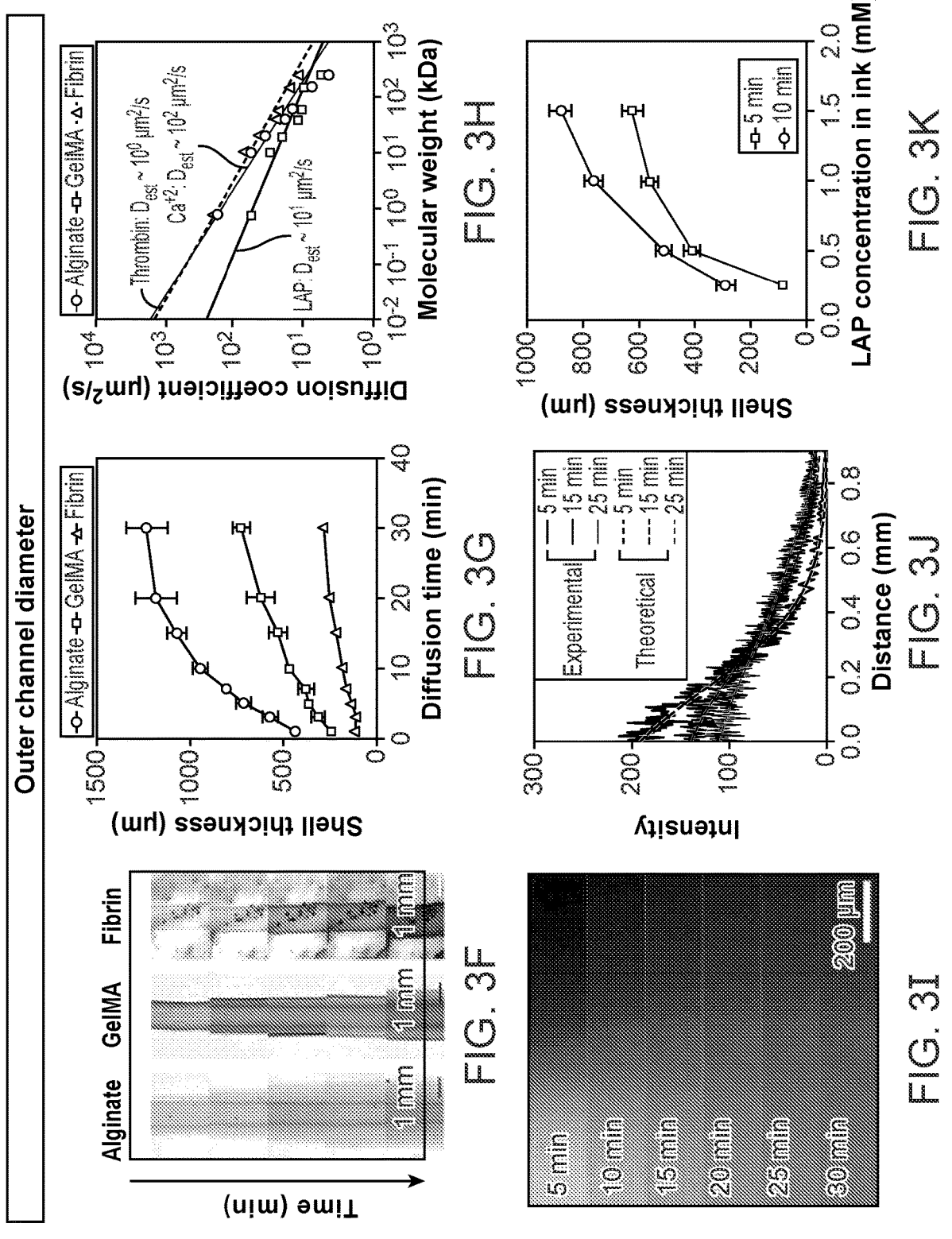

While the inner diameter of GUIDE-3DP channels is controlled through parameters during the printing process (i.e., applied pressure and speed), the outer diameter of the channel shell is controlled by the diffusion time after printing, during which the reaction-initiators diffuse away from the sacrificial ink into the surrounding gel precursor support material. With increasing diffusion time into the support material, the reaction-initiator is able to reach a farther distance away from the sacrificial ink, thus increasing the thickness of the outer shell (FIGS. 3f-g; 8a-c). Therefore, the relationship between the post-printing diffusion time and outer diameter thickness is dependent on the diffusion rate of the reaction-initiator within the gel precursor support material, which can be modeled as Fickian diffusion. The diffusion rate can be predicted by estimating the diffusivity of the reaction-initiator through the support material. Here we demonstrate examples for three different gel precursor materials and crosslinking approaches: GelMA as a photocrosslinked material (reaction-initiator: LAP), alginate as a small molecule crosslinked material (reaction-initiator: $Ca^{2+}$), and fibrin as an enzymatically crosslinked material (reaction-initiator: thrombin). Fluorescence Recovery After Photobleaching (FRAP) measurements on solutes of different molecular weights (ranging between 0.7 and 250 kDa) were used to estimate the diffusivity for the corresponding reaction-initiators (FIGS. 3h; 8d). For reaction-initiators with lower molecular weights (MW), the higher diffusivity allows the reaction-initiator to diffuse faster (e.g., $Ca^{2+}$ for alginate crosslinking, MW=40 Da, $D_{est} \sim 800$ μm$^2$/s vs. thrombin for fibrin crosslinking, MW=36 kDa, $D_{est} \sim 4$ μm$^2$/s). This leads to a faster rate of outer diameter increase for high-diffusivity material systems (i.e. $Ca^{2+}$/alginate) compared to low-diffusivity systems (i.e. thrombin/fibrin) (FIG. 3g).

For a given support material/reaction-initiator combination, the Fickian diffusion of the reaction-initiator over time can be monitored and predicted with finite element modeling (FEM). Specifically, we employed FEM to study the diffusion of LAP (MW=294 Da, $D_{est}$~80 $\mu m^2$/s) through a GelMA gel precursor material. By first using fluorescent dextran (FITC-dextran, MW=1000 Da) as a tracer molecule in the GelMA gel precursor material, we measured the experimental diffusion rate away from the printed sacrificial ink filament (FIG. 3i). These measurements exhibited excellent agreement with the computational predictions (FIG. 3j) using the diffusion coefficient obtained from experimental FRAP analysis (FIG. 3h). Finally, in addition to the diffusion time, one can also control the diffusion rate, and hence the outer shell diameter, by simply changing the concentration of the reaction-initiator in the sacrificial ink. With higher concentrations of LAP encapsulated in the sacrificial ink (tested between 0.25 mM and 1.5 mM LAP), the outer GelMA shell diameter at a given time point increases (FIG. 3k). With these strategies, both the inner channel diameter and the outer shell diameter of the GUIDE-3DP channels can be independently controlled.

Of the three demonstrated crosslinking approaches for solidifying the channel into a robust gel, photocrosslinking requires a light-initiation step to induce the reaction, effectively decoupling the diffusion and reaction steps and allowing fabrication of more complex structures (FIG. 4). As a first example, we demonstrate the ability to control the intersection of two GelMA channels (FIGS. 9a; 4a). By printing two LAP-containing sacrificial ink filaments that contact each other within a GelMA support material, a continuously smooth interface is created. Following UV exposure, this results in the fabrication of a branched network with an open, seamless, leak-proof interface (FIG. 9a). Fabricating these types of free-standing, intersecting channel structures has previously proved difficult with other technologies.

Furthermore, we can design open networks in which different branches have unique, user-specified diameters. As described above, two strategies can be used to control the outer diameter of printed GUIDE-3DP channels: varying reaction-initiator concentration or diffusion time (FIGS. 3f-k). To demonstrate how these strategies can be employed in a more complex structure, we varied the concentration of photoinitiator within different, connected ink filaments. By modeling the photoinitiator diffusion (FIG. 4a, panel i), the concentrations required to achieve the desired outer channel diameters can be determined. In this way, connected channels of different channel thicknesses (160 $\mu m$ for the top branch with 1.0 mM LAP; 40 $\mu m$ for the bottom branch with 0.25 mM LAP) are constructed (FIG. 4a, panel ii). This type of structure (i.e., varied channel diameters connected at an open branch point) can also be achieved with a complementary approach in which the diffusion time of the photoinitiator from the ink is varied. In this demonstration, one filament (bottom) is printed 17 min after the first filament (top), such that the photoinitiator in the first filament has had more time to diffuse out, leading to a thicker channel (160 $\mu m$ for the top branch with 20 min LAP diffusion time; 35 $\mu m$ for the bottom branch with 3 min LAP diffusion time) (FIG. 4b). The ability to fabricate these perfusable networks with open branch points and bespoke channel sizes is uniquely enabled by material systems in which the diffusion and reaction processes are decoupled, demonstrated here with GelMA/LAP as an exemplary photocrosslinkable material.

When two neighboring, parallel lines are printed, they can either fuse to form a single bulk structure with two internal channels or remain as two distinct, separate channels (FIG. 9b). Specifically, the fabrication of cohesive, fused channels is facilitated by shorter distances between the printed lines and longer diffusion times (FIG. 4c). These predictions allow for the design of multiple perfusable networks fused into a cohesive structure, which may be advantageous when fabricating complex constructs that require manipulation (e.g. for implantation) due to the increased structural rigidity.

Having established these physical principles of GUIDE-3DP with photoactive crosslinkers (FIG. 4a-c), we next sought to demonstrate fabrication of physiologically relevant structures. As a first example, we selected a model of the human coronary sinus and cardiac veins, which have differing internal and outer diameters (FIG. 4d, panel i). COMSOL modeling of LAP diffusion through GelMA informed the diffusion time required to fabricate these branched channels of desired geometry (FIG. 4d, panels ii and iii). The creation of this tubular architecture with open intersections of multiple smaller channels was validated with a GelMA print, which had sufficient structural integrity to be removed from the support material for imaging (FIG. 4e).

Using the GUIDE-3DP strategy with photocrosslinkable materials also allows us to design two or more distinct perfusable networks within the same structure (FIGS. 9c; 4f). This is enabled by formulating the sacrificial ink to be thixotropic and self-healing, which allows the nozzle to pass through the printed path of the first network without causing permanent deformation while printing the path of the second network. In this way, two intertwined perfusable channels were fabricated, opening the door to printing of more complex vascular-like networks, which often require the extrusion nozzle to pass through ink that has been previously deposited (FIG. 9c).

As a demonstration, we printed a coronary vascular network geometry within a GelMA support using cardiac structural data from the National Institutes of Health (NIH) 3D Print Exchange (FIG. 4f). This coronary vessel structure was built by first printing the coronary artery structure (ink) and then the coronary vein structure (ink) (FIG. 4f, panels ii and iii). Both coronary structures were stable during printing and exhibited no visible changes after UV crosslinking. Crosslinking was performed 20 min after finishing the printing process, demonstrating the short working times achievable with our GUIDE-3DP method (FIG. 4f, panels iv and v). The coronary vessel-like print demonstrated high structural integrity, allowing it to be removed from the uncrosslinked gel precursor support material with forceps for rinsing with saline (FIG. 4f, panel vi). Confocal microscopy images show that the UV-crosslinked shell structures stained by FITC-dextran homogeneously surround the printed vessels (FIG. 4f, panel vii). We observed excellent extrusion consistency and structural stability throughout the 3D printing process, which was evident from the high lateral and axial uniformity observed across the coronary artery and coronary vein structures.

With the GUIDE-3DP strategy, different materials that utilize the same reaction-initiator may also be crosslinked together into a cohesive print. As a demonstration, we fabricated three photocrosslinkable materials into a single, perfusable structure (FIG. 4g). Pre-labeled GelMA, MeHA, and PEGDA were first 3D printed into distinct regions within a larger, unlabeled GelMA support matrix; then upon printing a single, LAP-containing sacrificial ink, a continuous channel with different material segments was formed.

Finally, the GUIDE-3DP strategy allows for not only fabrication of channels with biologically relevant geometries but also integration with living cells. As the hydrogel materials used in this study for GUIDE-3DP are highly cytocompatible, tailored vessel structures can be seeded with human umbilical vein endothelial cells (HUVECs) to achieve an in vitro cell-lined blood vessel model. Customizable vessels with tunable dimensions and multiple furcation points are highly relevant as models for stenosis or vessel calcification.

Figure 5B:
FIGS. 5A-5C. The inner lumens of perfusable vessels printed with GUIDE-3DP can be seeded with endothelial cells.
Figure 5A:
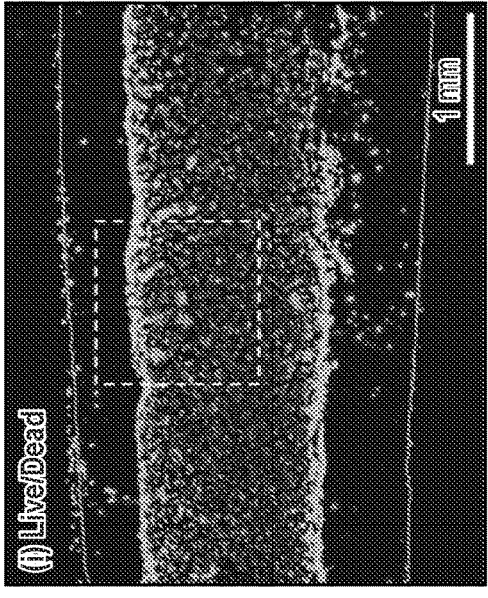
Figure 5C:
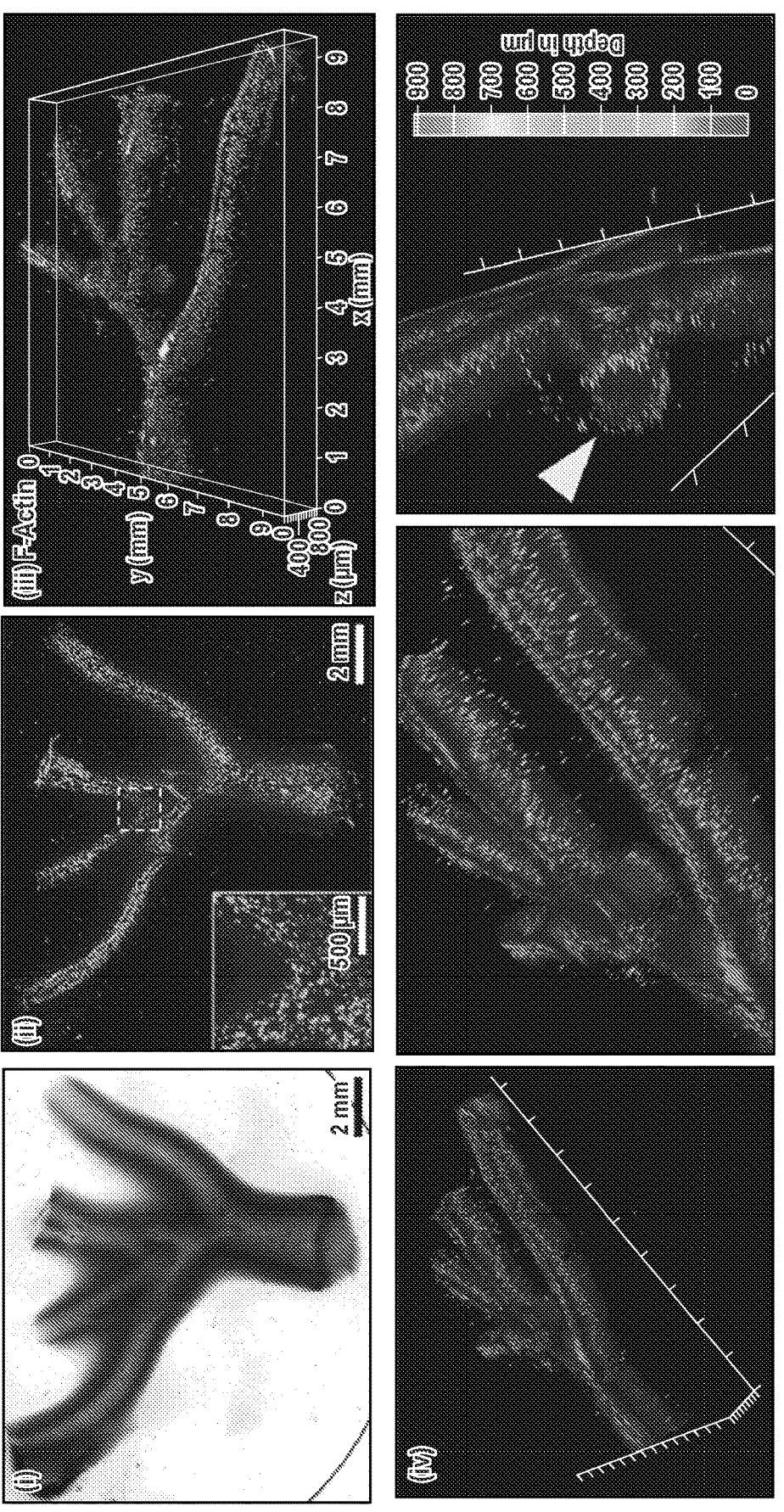
Figure 8A:
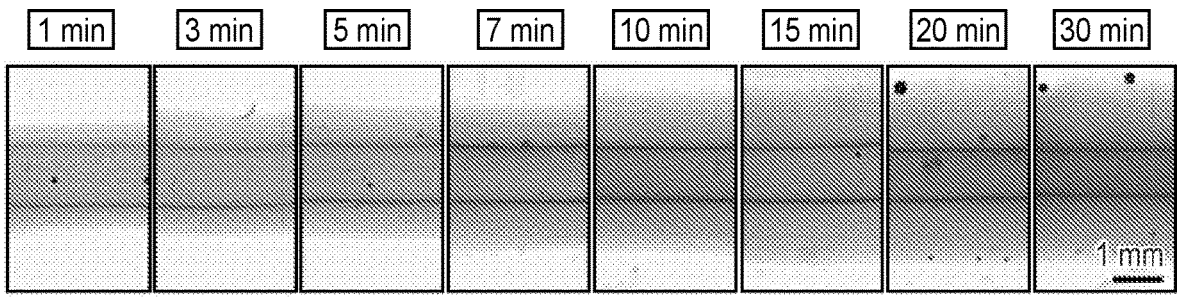
FIG. 8A-8D. The outer diameters of GUIDE-3DP channels increase with greater reaction-initiator diffusion times within (FIG. 8a) alginate, (FIG. 8b) GelMA, and (FIG. 8c) fibrin gel precursor support materials.
Figure 8B:
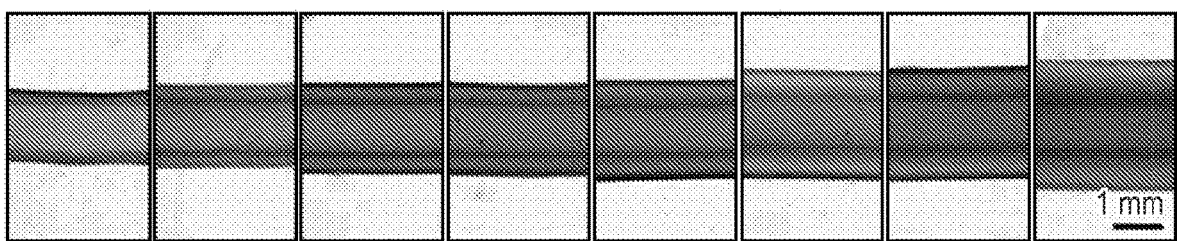
Figure 8C:
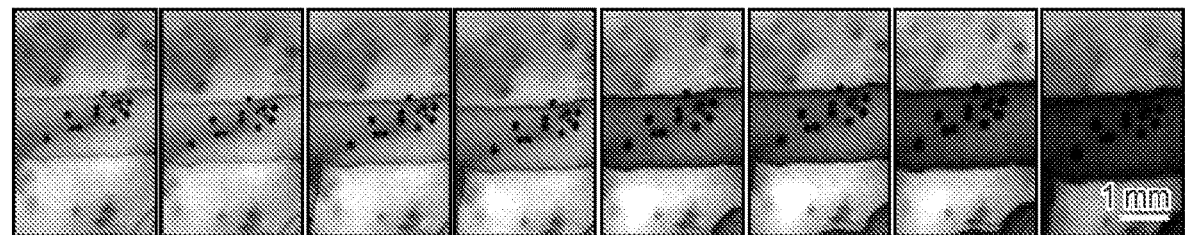
Figure 8D:
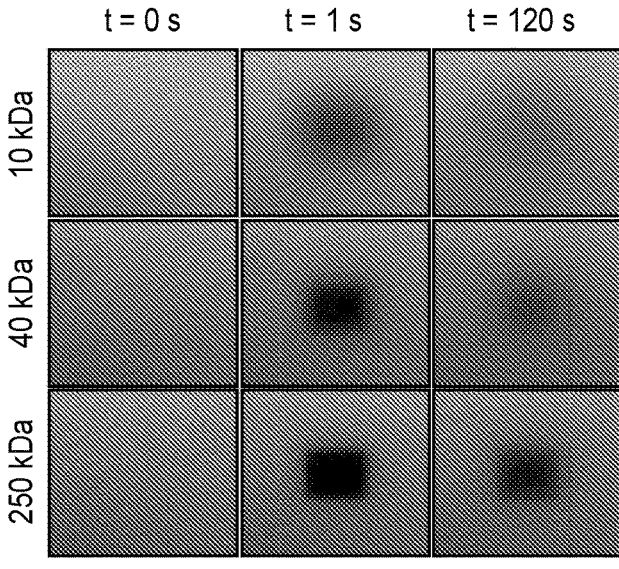

Successful seeding of HUVECs was demonstrated within GelMA channels fabricated with GUIDE-3DP (FIG. 5). The HUVECs were introduced into the hollow channels with perfusion, and adherent cells showed high cell viability 3 days after seeding (FIG. 5a-b). As a demonstration of a more complex vasculature-like structure, we fabricated a branched channel network (FIG. 5c). The channel, which consisted of a thicker parent vessel (inner diameter: 2 mm) with four smaller daughter vessels (inner diameters: 1.0-1.5 mm), showed a continuously open lumen that was fully perfusable without leakage (FIG. 5c, panel i). Therefore, the lining of the vessel lumen with viable HUVECs was possible (FIG. 5c, panels ii, iii, iv).

Figures 10A, 10B, 10C:
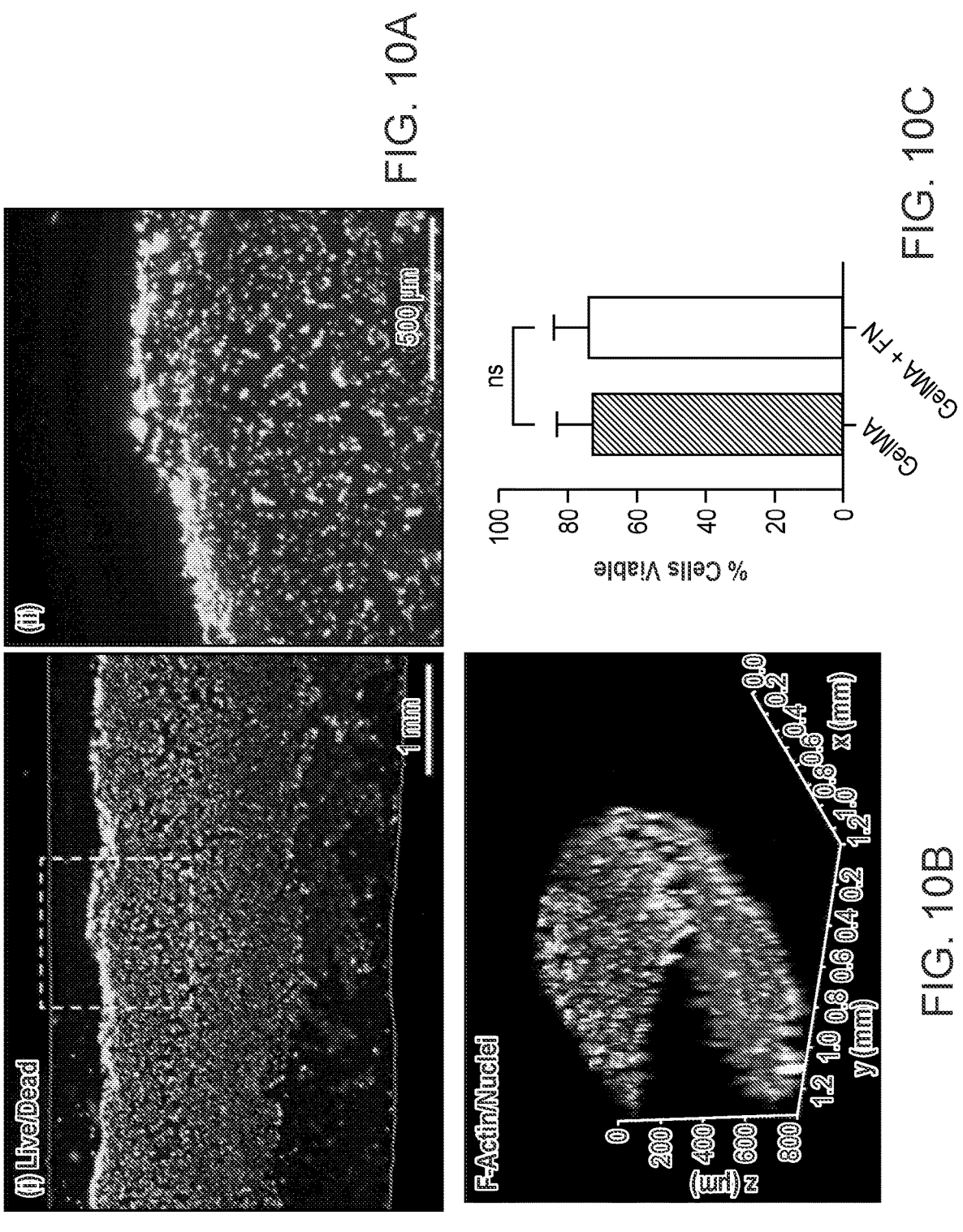
FIG. 10A-10C. Endothelial cells seeded within GelMA-fibronectin prints.
Figures 11A, 11B, 11C:
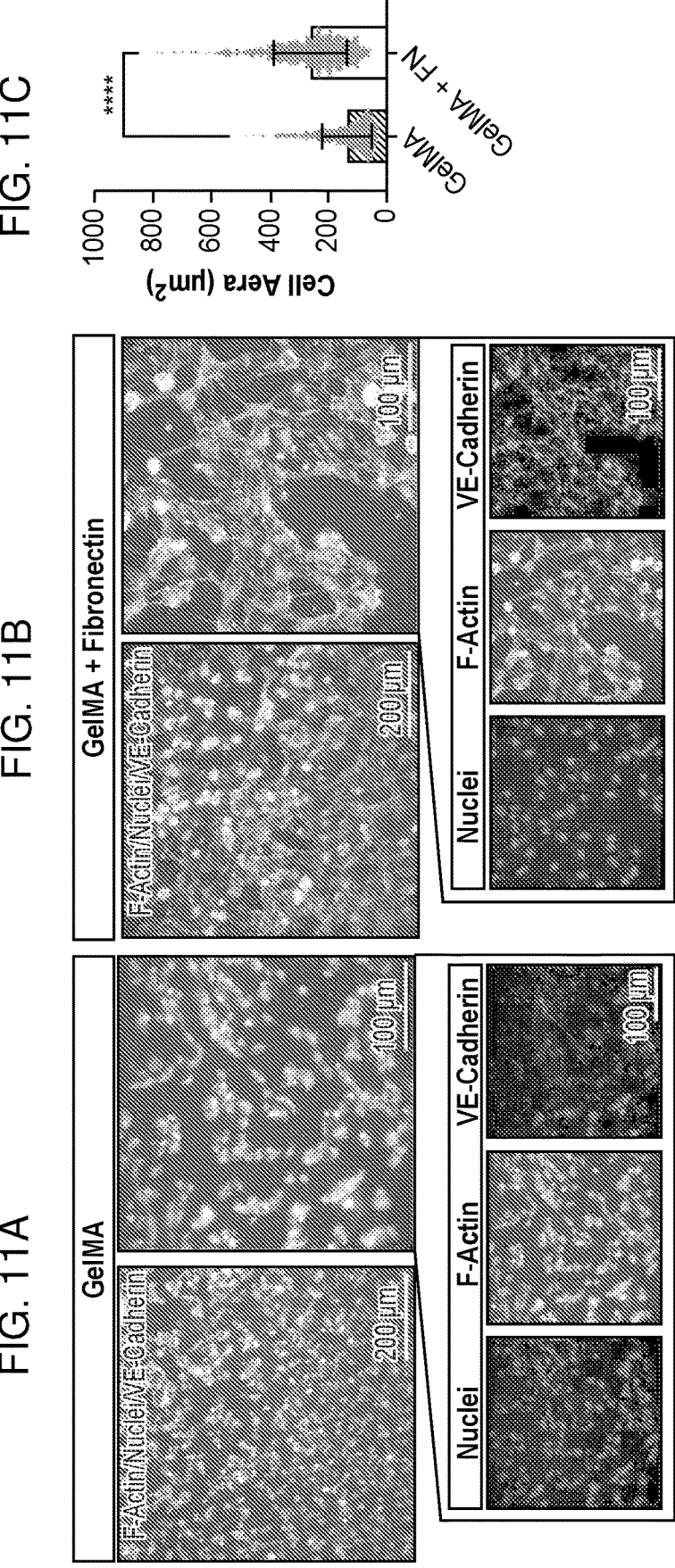
FIG. 11A-11C. Immunocytochemistry of endothelial cells seeded within GUIDE-3DP prints. Representative images of HUVEC-lined (FIG. 11a) GelMA and (FIG. 11b) GelMA+fibronectin vessels stained for nuclei (blue), F-actin (yellow), and VE-cadherin (magenta) 3 days post-seeding.

As endothelial cells are known to adhere well on fibronectin matrices in vitro, we incorporated 0.05 wt % fibronectin within the GelMA gel precursor support material prior to printing to demonstrate versatility in the biochemistry of GUIDE-3DP structures. While the viability of HUVECs was similar (around 70% live cells) for seeding within GelMA-only or GelMA-fibronectin prints (FIG. 10), the HUVECs exhibited greater spreading and expression of the endothelial adhesion molecule VE-cadherin along the inner lumens of GelMA-fibronectin channels (FIG. 11). The enhanced cellular spreading due to the added fibronectin is demonstrated by the increased overall cytoskeletal area per cell (261±127 $\mu m^2$ for GelMA-fibronectin vs. 135±84 $\mu m^2$ for GelMA-only). Thus, the GUIDE-3DP strategy allows for the integration of complex, branching, perfusable channels with living cells and is amenable to the addition of biomolecules in the gel precursor support material for future optimization of cell function.

We report a new 3D printing strategy termed Gelation of Uniform Interfacial Diffusant in Embedded 3D Printing (GUIDE-3DP) for fabricating bespoke, perfusable networks of self-supporting, interconnected channels. To achieve user-specified channel dimensions, this technique leverages the predictable diffusion of reaction-initiators released from sacrificial inks printed within the hydrogel precursor. The inner and outer diameters of vessels can be independently varied within a single print: inner diameters are controlled by the printing pressure and speed, while outer diameters are controlled by the reaction-initiator concentration and diffusion time. Finite element modeling can be used to relate the desired dimensions of a channel network to the printing parameters. Importantly, multiple channels can be seamlessly connected at branch points, and multiple networks of channels can be integrated into a single, cohesive, self-supporting print. We created a library of seven hydrogel precursor materials (gelled via photocrosslinking, small molecule crosslinking, or enzymatic crosslinking) and their corresponding reaction-initiators to highlight the versatility of this technology. Finally, we demonstrated the integration of the GUIDE-3DP approach with living endothelial cells that lined the inner lumens of blood vessel-like channels. Altogether, this technology represents an important advance toward the fabrication of self-supporting, physiologically relevant networks with intricate and perfusable geometries.

Materials and Methods

Gel precursor support materials preparation. For the gelatin methacryloyl (GelMA) gel precursor material, GelMA was synthesized using a protocol similar to those described previously. Gelatin from cold water fish skin (Sigma-Aldrich) was dissolved at 20 wt % in 0.1 M carbonate-bicarbonate (CB) buffer at 37° C. overnight. The pH was adjusted to 10. 83 µL of methacrylic anhydride (MAA, 94%, Sigma-Aldrich) per gram of gelatin was added dropwise while stirring at 100-200 rpm. The reaction was allowed to proceed at 70° C. for 2 h. GelMA was precipitated and collected after pouring the reaction mixture into ~3× reaction volume of ethanol. After drying the GelMA (>24 h), it was dissolved in deionized water at −80° C. for at least 1 h while stirring to remove residual ethanol. The GelMA concentration was determined as percentage of dry mass. To prepare the support material, respective stock solutions of GelMA and Aristoflex Aristoflex Ammonium Acryloyldimethyltaurate/VC Copolymer (AVC; Lotioncrafter) were blended to achieve the desired final concentrations.

For the poly(ethylene glycol) diacrylate (PEGDA) support material, 10 wt % of poly(ethylene glycol) diacrylate (PEGDA, MW: 20 kDa) was dissolved in PBS. The 10 wt % PEGDA solution was mixed in a 1:1 ratio with a 4 wt % AVC stock solution to form the 5 wt % PEGDA+2 wt % AVC support material.

For the methacrylated hyaluronic acid (MeHA) support material, sodium hyaluronic acid (HA, Lifecore Biomedical, 40 kDa Mw) was dissolved in deionized water at 1 wt %. Methacrylic anhydride (MAA, 94%, Sigma-Aldrich) was slowly added to the solution. The pH was adjusted to 8-9 with 6 N sodium hydroxide solution and the solution was gently stirred at 4° C. for 18 h, protected from light. The MeHA was subsequently precipitated by ethanol (95%) and dialyzed against deionized water using a cellulose acetate tube (molecular weight cut-off: 12 kDa) for three days, followed by lyophilization. The 2 wt % MeHA solution was then mixed in a 1:1 ratio with a 4 wt % AVC stock solution to form the 1 wt % MeHA +2 wt % AVC support material. For the polyacrylamide (PAAm) support material, 40 wt % of acrylamide (AAm, Sigma-Aldrich) and 0.2 wt % of N,N'-methylenebis(acrylamide) (Sigma-Aldrich) was dissolved in deionized water. They were mixed with a 4 wt % AVC stock solution to form the 20 wt % acrylamide+0.1 wt % N,N'-methylenebis(acrylamide)+2 wt % AVC support material.

For the alginate support material, alginic acid sodium salt from brown algae (Sigma-Aldrich) was dissolved at a concentration of 4 wt % in PBS. The 4 wt % alginate solution was then mixed in a 1:1 ratio with a 4 wt % AVC stock solution to form the 2 wt % alginate+2 wt % AVC support material.

For the fibrin support material, bovine fibrinogen (MP Biomedicals) was dissolved at a concentration of 10 wt % in PBS, and then mixed with a 4 wt % AVC stock solution to form the 5 wt % fibrinogen+2 wt % AVC support material.

For the gelatin support material, gelatin from cold water fish skin (Sigma-Aldrich) was dissolved at 20 wt % in PBS, and then mixed with a 4 wt % AVC stock solution to form the 10 wt % gelatin +2 wt % AVC support material.

Sacrificial ink preparation. To prepare the gelatin microparticle ink used in acellular printing experiments, gelatin microparticles were synthesized by complex coacervation, as previously described. Briefly, a solution of 6.4 wt % gelatin type A (300 bloom, Sigma-Aldrich), 0.5 wt % Pluronic F-127 (Sigma-Aldrich), and 0.2 wt % gum arabic (Alfa Aesar) in DI water was heated in a microwave until bubbling. Ethanol was added at 1 mL per gram of gelatin solution while stirring at 500 rpm. The mixture was then stirred overnight at 500 rpm at room temperature. The gelatin microparticles were collected and washed three times with DI water using a Büchner funnel, and the resultant slurry was compacted via vacuum filtration. The concentration of microparticles in the jammed slurry was determined as the percent dry mass after drying aliquots in a vacuum oven for 2 h at 60° C. Prior to printing, the microparticle concentration was adjusted to 4-10 wt % using a solution of crosslinking initiator in PBS (or HBSS for an alginate support material) such that the desired crosslinking initiator concentration was achieved (Table 3). The reaction-initiators included in the inks were calcium chloride dihydrate (Millipore) for an alginate support material, ammonium persulfate (APS, Sigma-Aldrich) for a PAAm support material, bovine thrombin (MP Biomedicals) for a fibrin support material, and lithium phenyl-2,4,6-trimethylbenzoylphosphinate (LAP, Sigma-Aldrich) for GelMA, MeHA, and PEGDA support materials. For cellular printing experiments, sterile lyophilized gelatin microparticles (LifeSupport, FluidForm Inc.) were rehydrated at a concentration of 10 wt % in sterile, cold PBS containing 5 mM LAP. For the gelatin support material, a sacrificial ink of 24 wt % Pluronic F-127 containing 1 wt % transglutaminase was used instead of gelatin microparticles.

Rheological characterization. To measure the rheological properties of the gel precursor support materials and sacrificial ink, samples were loaded onto an ARG2 stress-controlled rheometer (TA Instruments) equipped with a 40 mm diameter parallel plate geometry at a 1.0 mm gap height. Samples were subjected to shear stress-sweep experiments over a stress range of 0.1 to 1000 Pa at a frequency of 1 Hz at 25° C. The viscosity was measured at 25° C. using a range of shear rates from 0.1 to 1000 s$^{-1}$. The step-stress was measured at both a high-magnitude stress (300 Pa) and a low-magnitude stress (0.1 Pa). To characterize the temperature dependence of the gelatin microgel ink properties, temperature sweep experiments were performed from 25 to 37° C.

Fluorescence recovery after photobleaching (FRAP). Alginate, GelMA, and fibrin support materials were prepared with FITC-labeled diffusants (either 1 μg/mL diazide-PEG-FITC, 10 μg/mL of 10, 20, 40, 60, 150, 250 kDa FITC-dextran, Sigma). 150 μL of the diffusant-laden support materials were loaded into a clear bottom, 96-well plate and centrifuged to remove bubbles. FRAP experiments were performed using a confocal microscope (Leica SPE) with 30 s of photobleaching (100 μm×100 μm area, 488 nm laser, 100% intensity) and 90 s of capture time. Diffusion coefficients for each condition were calculated using the open source MATLAB code "frap analysis" based on the Hankel transform method.

3D printing. 3D printing was performed with a custom-built dual-extruder bioprinter modified from a MakerGear M2 Rev E plastic 3D printer and a custom-built pneumatic printer modified from a Creality Ender 3 3D printer. Prior to printing, the sacrificial ink was loaded into a 2.5 mL Hamilton Gastight syringe. Support materials were added to well plates or custom-made polycarbonate containers and centrifuged at 4000 rpm for 5 min at room temperature to remove bubbles. Print paths were created using the commercially available Rhinoceros software (Rhinoceros 5.0, Robert McNeel & Associates, Seattle, WA, USA). Using the Rhinoceros software, designed printing paths (2D lines) were segmented with 'divide' function to create 1D dots to determine the cartesian coordinates. The cartesian coordinates were saved as a .txt file and translated into G-code to set extrusion rates using CAMotics software. After printing, diffusion of the reaction-initiator was allowed to occur for a specified amount of time (Table 2). For photocrosslinkable materials (GelMA, MeHA, and PEGDA), the printed structure was crosslinked at 365 nm for 5 min using a UV lamp. After crosslinking, the structure was removed from the uncrosslinked support material using a metal spatula and washed by gently shaking in a 50 mL conical tube containing PBS (or HBSS for an alginate support materials). Once washed, the structures were placed into fresh PBS (or HBSS), and the sacrificial ink was melted by incubating at 37° C. for gelatin microparticles or at 4° C. for Pluronic F-127. The ends of the structures were cut, either before or after sacrificial ink melting, to allow fluid perfusion.

As preparation for endothelialization, materials and channels were processed in an aseptic environment. The support materials were autoclaved prior to use. To create linear channels (length=2 cm), a 10 wt % gelatin microparticle ink containing 5 mM LAP was printed into a 20 wt % GelMA+ 2.5 wt % AVC support material with and without 0.05 wt % fibronectin. To create the branched structure (total size x=13.7 mm, y=11.7 mm), the same sacrificial ink was printed into a 20 wt % GelMA+2.5 wt % AVC support material. After printing, the ends of the channels were cut using a sterile scalpel to enable subsequent perfusion seeding. Vessels were incubated in sterile PBS for at least 24 h at 37° C. prior to endothelialization.

Cell culture and endothelialization of printed structures. Human umbilical vein endothelial cells (HUVEC, Promo-Cell) were expanded to passage 6 or 7 in endothelial growth media (EGM-2 BulletKit, Lonza), and culture medium was changed every other day. For cell seeding on the inner lumen of 3D printed channels, HUVECs were enzymatically detached in 0.025% Trypsin-EDTA (Gibco) for 5 min at 37° C. and resuspended in EGM-2 media at ~1×10$^7$ cells/mL. The cell suspension was then injected via pipette into the vessel lumen (approx. 20 μL≙2×10$^5$ cells per cm of vessel length). The channels were incubated at 37° C. for a total of 80 min, during which two incubation steps were performed on each side, flipping by 180° and injecting 20 μL of fresh cell suspension between each step, to allow HUVEC adhesion to the entire inner lumen. Vessels were incubated in EGM-2 medium after cell seeding, and culture medium was changed every other day.

Fluorescent staining and imaging. Cell viability in printed structures was assessed after 3 days of culture using Live/Dead staining (Thermo Fisher Scientific). Live cells were stained with calcein AM (2 μM) and dead cells were stained with ethidium homodimer-1 (EthD-1; 4 μM) in PBS for 30 min at 37° C. The printed structures were then imaged using a Leica THUNDER fluorescence microscope using 2.5× and 10× objectives. Z-stack images (total thickness 800-1000 μm) were processed in Fiji (version 1.53).[44] Cell viability was calculated as the ratio (in %) of viable cells (calcein AM-stained cells) to all cells (sum of calcein AM- and EthD-1-stained cells) with N=3 replicate printed structures, n=1211-4133 cells per printed structure.

For immunocytochemistry to observe cell distribution and morphology, samples were fixed for 30 min using 4% paraformaldehyde in PBS, then washed three times with PBS for 15 min each. Cells were permeabilized with 0.1% Triton X-100 in PBS (PBST) for 1 h. Non-specific binding was prevented by blocking in 0.05% Triton X-100, 5% normal goat serum, and 0.5 wt % bovine serum albumin (BSA, Roche) in PBS for 3 hours. Primary antibody anti-VE-cadherin (Rabbit mAb, Cell Signaling Technology, 1:250) diluted in 0.05% Triton X-100, 2.5% normal goat serum, and 0.25 wt % BSA was applied for 1 h at room temperature, followed by four washing steps in PBS for 20 min each. A fluorescently tagged secondary antibody (Goat anti-rabbit, Alexa Fluor 647, Thermo Fisher Scientific) diluted in the same antibody solution was applied for 1 h, followed by three PBS washes for 20 min. Cell nuclei and actin cytoskeleton were stained by incubation with 4', 6-di-amidino-2-phenylindole, dihydrochloride (DAPI, Thermo Fisher Scientific, 1 µg/m L) and phalloidin-tetramethylrho-damine B isothiocyanate (TRIO-phalloidin, Sigma-Aldrich, 0.2 µg/mL) in PBST for 1 h at room temperature, followed by three PBS washing steps for 15 min. Samples were imaged using a Leica THUNDER fluorescence microscope. Representative images were processed in Fiji, and cell size was quantified using CellProfiler (version 4.2.5).

Computational modeling. COMSOL Multiphysics (version 5.6) was employed to simulate the diffusion of the photoinitiator LAP from the printed sacrificial ink filament over time. A three-dimensional finite element model (FEM) was created using a Time Dependent study in the Transport of Diluted Species interface. The model geometry was imported with an STL file designed according to the G-code path, and the diameter was set according to that of the printed filament. To simulate LAP transport, the diffusion coefficient of LAP obtained using FRAP (Desi ~80 µm²/s) was entered into the model, and the initial concentration of LAP in the sacrificial ink was set according to experimental values. A tetrahedral physics-controlled mesh with the pre-defined Finer element size was used in all simulations. The concentration profiles of LAP as a function of distance from the ink filament were then calculated for diffusion times ranging between 0 and 30 min.

Statistical analysis. Results were plotted in GraphPad Prism (version 9.3). For the comparison of cell viability and area, statistical significance was assessed using a two-tailed Mann-Whitney test (ns=not significant; ***$p<0.0001$). Data are presented as the mean±the standard deviation (SD) unless specified otherwise.

TABLE 2

Printing parameters for constructs presented in this work.

| Print Description | Gel material• | Diffusion time (min) | Printing speed (mm/s) | Extrusion rate (µl/s) or printing pressure (psi) |
|---|---|---|---|---|
| Single linear line | GelMA(10%) | 5 min | 5 mm/s | 15 µl/s |
| Single linear line | GelMA(10%) | 20 min | 5 mm/s | 4 µl/s |
| Single linear line | GelMA(10%) | 1 min | 5 mm/s | 4 µl/s |
| Fused 8 lines | GelMA(10%) | N/A | 5 mm/s | 4 µl/s |
| Fused spiral line | GelMA(10%) | N/A | 5 mm/s | 4 µl/s |
| Winding lines | GelMA(10%) | 10 min | 5 mm/s | 4 µl/s |
| Winding line | MeHA(1%) | 10 min | 5 mm/s | 4 µl/s |
| Winding line | PEGDA(5%) | 10 min | 5 mm/s | 4 µl/s |
| Winding line | Alginate (2%) | 5 min | 5 mm/s | 4 µl/s |
| Winding line | PAAm (20%) | 5 min | 5 mm/s | 4 µl/s |
| Winding line | Fibrin (5%) | 20 min | 5 mm/s | 4 µl/s |
| Winding line | Gelatin (10%) | 20 min | 5 mm/s | 4 µl/s |
| Letters ("GelMA") | GelMA(10%) | N/A | 5 mm/s | 0.4 µl/s |
| Letters ("MeHA") | MeHA(1%) | N/A | 5 mm/s | 0.4 µl/s |
| Letters ("PAam") | PAAm (20%) | N/A | 5 mm/s | 0.4 µl/s |
| Letters ("PEGDA") | PEGDA(5%) | N/A | 5 mm/s | 0.4 µl/s |
| Single linear line, right angle | GelMA(10%) | N/A | 5 mm/s | 4 µl/s |
| Single linear line | GelMA(10%) | N/A | 5 mm/s | Variable pressure |
| Lines | GelMA(10%) | 5 min | 5 mm/s | Variable pressure |
| Lines | GelMA(10%) | 5 min | Variable speed | 25 psi |
| Intestinal | GelMA(10%) | 5 min | 2 mm/s and 1 mm/s | 40 psi |
| Vasculature | GelMA(10%) | 5 min | 3 mm/s and 4 mm/s | 40 psi |
| Single linear line | Alginate (2%) | Variable times | 5 mm/s | 4 µl/s |
| Single linear line | GelMA(10%) | Variable times | 5 mm/s | 4 µl/s |
| Single linear line | Fibrin (5%) | Variable times | 5 mm/s | 4 µl/s |
| Single linear line | GelMA(10%) | Variable times | 5 mm/s | 4 µl/s |
| Branched lines | GelMA(10%) | 20 min | 5 mm/s | 1 µl/s |
| Coronary sinus | GelMA(10%) | 20 min | 5 mm/s (10 times) | 4 µl/s |
| Small cardiac vein | GelMA(10%) | 3 min | 5 mm/s (1 time) | 4 µl/s |
| Coronary vessel network | GelMA(10%) | 20 min | 5 mm/s | 4 µl/s |
| Single linear line | GelMA(10%), MeHA(1%), PEGDA(5%) | 5 min | 5 mm/s | 4 µl/s |
| Intersection | GelMA(10%) | 5 min | 5 mm/s | 4 µl/s |
| Fused channels | GelMA(10%) | 5 min | 5 mm/s | 4 µl/s |
| Axial vessel and helix | GelMA(10%) | 5 min | 5 mm/s | 4 µl/s |
| Single linear line | GelMA(20%) | 5 min | 5 mm/s | 8 µl/s |
| Branched vascular-like channel | GelMA(20%) | 5 min | 5 mm/s | 8 µl/s |

TABLE 2-continued

Printing parameters for constructs presented in this work.

| Print Description | Gel material• | Diffusion time (min) | Printing speed (mm/s) | Extrusion rate (µl/s) or printing pressure (psi) |
|---|---|---|---|---|
| Single linear line | GelMA (20%), AVG (2.5%) | | | |
| fibronectin (0.05%) | 5 min | 5 mm/s | 8 µl/s | |
| Single linear line | GelMA (20%), AVG (2.5%), fibronectin 0.05% | 5 min | 5 mm/s | 8 µl/s |

TABLE 3

Formulations of the gel precursor support materials and sacrificial inks used for GUIDE-3DP.

| | Support Material | | | Sacrificial Ink | | |
|---|---|---|---|---|---|---|
| Mechanism | Hydrogel | Co-initiator | Viscosity modifier | Gelatin microgels | Pluronic F-127 | Reaction initiator |
| Small Molecule Cross-linking | Alginate 2 wt % | | Aristoflex AVC 2 wt % | 8 wt % | | CaCl$_2$ 1 wt % |
| | PAAm 20 wt % | TEMED 20 mM Bis-acrylamide 0.1 wt %) | Aristoflex AVC 2 wt % | 8 wt % | | APS 20 mM |
| Photocrosslinking | GelMA 10 wt % | | Aristoflex AVC 2 wt % | 8 wt % | | LAP 2 mM |
| | MeHA 2 wt % | | Aristoflex AVC 2 wt % | 8 wt % | | LAP 2 mM |
| | PEGDA 5 wt % | | Aristoflex AVC 2 wt % | 8 wt % | | LAP 2 mM |
| Enzymatic crosslinking | Fibrin 5 wt % | | Aristoflex AVC 2 wt % | 8 wt % | | Thrombin 500 Uml$^{-1}$ |
| | Gelatin 10 wt % | | Aristoflex AVC 2 wt % | | 24 wt % | Transglutaminase 1 wt % |

REFERENCES

E. K. Hendow, P. Guhmann, B. Wright, P. Sofokleous, N. Parmar, R. M. Day, *Fibrogenesis Tissue Repair* 2016, 9, 3.

K. Ahookhosh, O. Pourmehran, H. Aminfar, M. Mohammadpourfard, M. M. Sarafraz, H. Hamishehkar, *Eur. J. Pharm. Sci. Off. J. Eur. Fed. Pharm. Sci.* 2020, 145, 105233.

C. O'Connor, E. Brady, Y. Zheng, E. Moore, K. R. Stevens, *Nat. Rev. Mater.* 2022, 7, 702.

M. Schaupper, M. Jeltsch, S. Rohringer, H. Redl, W. Holnthoner, *Tissue Eng. Part B Rev.* 2016, 22, 395.

J. Basu, T. A. Bertram, *Toxicol. Pathol.* 2014, 42, 82.

C. J. Mandrycky, C. C. Howard, S. G. Rayner, Y. J. Shin, Y. Zheng, *J. Mol. Cell. Cardiol.* 2021, 159, 1.

L. Si, H. Bai, M. Rodas, W. Cao, C. Y. Oh, A. Jiang, R. Moller, D. Hoagland, K. Oishi, S. Horiuchi, S. Uhl, D. Blanco-Melo, R. A. Albrecht, W.-C. Liu, T. Jordan, B. E. Nilsson-Payant, I. Golynker, J. Frere, J. Logue, R. Haupt, M. McGrath, S. Weston, T. Zhang, R. Plebani, M. Soong, A. Nurani, S. M. Kim, D. Y. Zhu, K. H. Benam, G. Goyal, S. E. Gilpin, R. Prantil-Baun, S. P. Gygi, R. K. Powers, K. E. Carlson, M. Frieman, B. R. tenOever, D. E. Ingber, *Nat. Biomed. Eng.* 2021, 5, 815.

G. J. Mahler, M. B. Esch, R. P. Glahn, M. L. Shuler, *BiotechnoL Bioeng.* 2009, 104, 193.

M. Carrabba, P. Madeddu, Front. Bioeng. *BiotechnoL* 2018, 6, 41.

L. Gui, L. E. Niklason, *Curr. Opin. Chem. Eng.* 2014, 3, 68.

A.-L. Duchemin, H. Vignes, J. Vermot, R. Chow, *Curr. Opin. Genet. Dev.* 2019, 57, 106. [12]S.

Vianello, M. P. Lutolf, *Dev. Ce*l12019, 48, 751.

L. G. Brunel, S. M. Hull, S. C. Heilshorn, *Biofabrication* 2022, 14, DOI 10.1088/1758-5090/ac6bbe.

A. J. Seymour, A. D. Westerfield, V. C. Cornelius, M. A. Skylar-Scott, S. C. Heilshorn, *Biofabrication* 2022, 14, DOI 10.1088/1758-5090/ac4fb5.

C. Norotte, F. S. Marga, L. E. Niklason, G. Forgacs, *Biomaterials* 2009, 30, 5910.

Tabriz, M. A. Hermida, N. R. Leslie, W. Shu, *Biofabrication* 2015, 7, 045012.

Ouyang, J. P. K. Armstrong, Y. Lin, J. P. Wojciechowski, C. Lee-Reeves, D. Hachim, K. Zhou, J. A. Burdick, M. M. Stevens, *Sci. Adv.* 2020, 6, eabc5529.

Dolati, Y. Yu, Y. Zhang, A. M. De Jesus, E. A. Sander, I. T. Ozbolat, *Nanotechnology* 2014, 145101.

Gao, Y. He, J. Fu, A. Liu, L. Ma, *Biomaterials* 2015, 61, 203.

Jia, P. S. Gungor-Ozkerim, Y. S. Zhang, K. Yue, K. Zhu, W. Liu, Q. Pi, B. Byambaa, M. R. Dokmeci, S. R. Shin, A. Khademhosseini, *Biomaterials* 2016, 106, 58.

Wu, A. DeConinck, J. A. Lewis, *Adv. Mater.* 2011, 23, H178.

Miller, K. R. Stevens, M. T. Yang, B. M. Baker, D.-H. T. Nguyen, D. M. Cohen, E. Toro, A. A. Chen, P. A. Galie, X. Yu, R. Chaturvedi, S. N. Bhatia, C. S. Chen, *Nat. Mater.* 2012, 11, 768.

Kolesky, R. L. Truby, A. S. Gladman, T. A. Busbee, K. A. Homan, J. A. Lewis, *Adv. Mater.* 2014, 26, 3124.

Duarte Campos, A. Blaeser, M. Weber, J. Jakel, S. Neuss, W. Jahnen-Dechent, H. Fischer, *Biofabrication* 2013, 5, 015003.

Shiwarski, A. R. Hudson, J. W. Tashman, A. W. Feinberg, *APL Bioeng.* 2021, 5, 010904.

Gioffredi, M. Boffito, S. Calzone, S. M. Giannitelli, A. Rainer, M. Trombetta, P. Mozetic, V. Chiono, *Procedia CIRP* 2016, 49, 125.

Kolesky, K. A. Homan, M. A. Skylar-Scott, J. A. Lewis, *Proc. Natl. Acad. Sci. U.S.A.* 2016, 113,3179.

Suntornnond, E. Y. S. Tan, J. An, C. K. Chua, *Sci. Rep.* 2017, 7, 16902.

Jeong, H. Nam, J. Jang, S.-J. Lee, Bioeng. *Basel Switz.* 2020, 7, 32.

Mohan, P. Datta, S. Nesaei, V. Ozbolat, I. T. Ozbolat, *Prog. Biomed. Eng. Bristol Engl.* 2022, 4, 022003.

Kassem, S. Lake, W. Roberts, S. Salandy, M. Loukas, *Transl. Res. Anat.* 2021, 23, 100096.

Saremi, H. Muresian, D. Sanchez-Quintana, *Radiogr. Rev. Publ. Radiol. Soc. N. Am. Inc* 2012, 32, E1.

Unagolla, A. C. Jayasuriya, *Appl. Mater. Today* 2020, 18, 100479.

Chen, X. Zhang, R. Millican, T. Lynd, M. Gangasani, S. Malhotra, J. Sherwood, P. T. Hwang, Y. Cho, B. C. Brott, G. Qin, H. Jo, Y.-S. Yoon, H.-W. Jun, *Front. Cardiovasc. Med.* 2021, 8, 790529.

Bowler, W. D. Merryman, *Cardiovasc. Pathol. Off. J. Soc. Cardiovasc. Pathol.* 2015, 24, 1.

Heilshorn, K. A. DiZio, E. R. Welsh, D. A. Tirrell, *Biomaterials* 2003, 24, 4245.

Seymour, S. Shin, S. C. Heilshorn, *Adv. Healthc. Mater.* 2021, 10, e2100644

Jönsson, M. P. Jonsson, J. O. Tegenfeldt, F. Höök, *Biophys. J.* 2008, 95, 5334.

Pusch, T. J. Hinton, A. W. Feinberg, *HardwareX* 2018, 3, 49.

Lee, A. R. Hudson, D. J. Shiwarski, J. W. Tashman, T. J. Hinton, S. Yerneni, J. M. Bliley, P. G. Campbell, A. W. Feinberg, *Science* 2019, 365, 482.

Hull, C. D. Lindsay, L. G. Brunel, D. J. Shiwarski, J. W. Tashman, J. G. Roth, D. Myung, A. W. Feinberg, S. C. Heilshorn, *Adv. Fund. Mater.* 2021, 31, 2007983.

Shin, J. Hyun, *ACS Appl. Mater. Interfaces* 2017, 9, 26438.

Shin, H. Kwak, D. Shin, J. Hyun, *Nat. Commun.* 2019, 10, 4650.

Schindelin, I. Arganda-Carreras, E. Frise, V. Kaynig, M. Longair, T. Pietzsch, S. Preibisch, C. Rueden, S. Saalfeld, B. Schmid, J.-Y. Tinevez, D. J. White, V. Hartenstein, K. Eliceiri, P. Tomancak, A. *Cardona, Nat. Methods* 2012, 9, 676.

What is claimed is:

1. A method for fabricating a 3D perfusable network, the method comprising:

(i) contacting a support material with an injection means, wherein the support material comprises a crosslinkable monomer or polymer and a viscosity modifier, in the absence of a crosslinking initiator;

(ii) injecting a printable composition into the support material using the injection means; wherein the printable composition comprises a sacrificial ink, and a crosslinking initiator;

(iii) moving the injection means in a desired 3D shape wherein the injection means is continuously injecting the printable composition into the support material, and (iv) altering the temperature of the support material to melt the sacrificial ink.

2. The method of claim 1 wherein the sacrificial ink comprises gelatin that melts at a temperature of from about 25° C. to about 37° C.

3. The method of claim 1, wherein the sacrificial ink comprises poloxamer 407 that melts at a temperature of from about 0° C. to about 10° C.

4. The method of claim 1, wherein the crosslinkable polymer is a photocrosslinking polymer selected from the group of gelatin methacryloyl (GelMA), hyaluronic acid methacrylate (HAMA), and poly(ethylene glycol) diacrylate (PEGDA); and the crosslinking initiator is LAP.

5. The method of claim 4, further comprising exposing the support material to ultraviolet radiation.

6. The method of claim 1, wherein the crosslinkable polymer is selected from alginate and polyacrylamide.

7. The method of claim 6, wherein the crosslinking initiator is $CaCl_2$) or ammonium persulfate (APS).

8. The method of claim 6, wherein the support material comprises polyacrylamide, tetramethylethylenediamine (TEMED) and bis acrylamide.

9. The method of claim 1, wherein the crosslinkable polymer is selected from fibrinogen and gelatin.

10. The method of claim 9, wherein the crosslinking initiator is thrombin or transglutaminase.

11. The method of claim 1, wherein the viscosity modifier is aristoflex AVC.

12. The method of claim 1, wherein the 3D perfusable network comprises fused intersections.

13. The method of claim 1, wherein the 3D perfusable network comprises non-fused intersections.

14. The method of claim 1, wherein the exterior of the 3D perfusable network is smooth and continuous.

15. The method of claim 1, wherein the 3D perfusable network further comprises cells.

16. The method of claim 1, wherein the method produces a hollow 3D structure with a variable diameter, wherein the diameter varies from about 2000 µm to about 50 µm.

17. The method of claim 1, wherein the method produces a hollow 3D structure comprising angles from at least about 10° to at least about 180°.

18. The method of claim 1, wherein the 3D perfusable network comprises a self-supporting printed structure with vessel walls and an open, hollow lumen.

19. The method of claim 18, further comprising removing the sacrificial ink and unreacted gel precursor material.

\* \* \* \* \*